(12) United States Patent
McGill

(10) Patent No.: US 9,173,525 B2
(45) Date of Patent: Nov. 3, 2015

(54) BLENDING ASSEMBLY

(75) Inventor: Shane Robert McGill, Kent (GB)

(73) Assignee: MCGILL TECHNOLOGY LIMITED, Kent (GB)

( * ) Notice: Subject to any disclaimer, the term of this patent is extended or adjusted under 35 U.S.C. 154(b) by 823 days.

(21) Appl. No.: 11/813,484

(22) PCT Filed: May 26, 2006

(86) PCT No.: PCT/GB2006/001945
§ 371 (c)(1),
(2), (4) Date: Aug. 6, 2007

(87) PCT Pub. No.: WO2006/126009
PCT Pub. Date: Nov. 30, 2006

(65) Prior Publication Data
US 2008/0037360 A1    Feb. 14, 2008

(30) Foreign Application Priority Data

May 27, 2005  (GB) .................................... 0510767.7
Aug. 22, 2005  (GB) .................................... 0517194.7

(51) Int. Cl.
*A47J 43/08*  (2006.01)
*A47J 43/06*  (2006.01)
*A47J 43/07*  (2006.01)

(52) U.S. Cl.
CPC ............... *A47J 43/085* (2013.01); *A47J 43/06* (2013.01); *A47J 43/0716* (2013.01)

(58) Field of Classification Search
CPC ..................................................... A47J 43/085
USPC ............... 241/199.12, 282.1, 282.2; 366/199, 366/204, 205, 249–251, 314
See application file for complete search history.

(56) References Cited

U.S. PATENT DOCUMENTS

| | | | | |
|---|---|---|---|---|
| 1,085,858 A | * | 2/1914 | Fulton | 366/251 |
| 1,742,878 A | * | 1/1930 | Rosenberg | 366/249 |
| 2,030,158 A | * | 2/1936 | Schwimmer | 366/171.1 |
| 2,042,176 A | * | 5/1936 | Hausman | 366/251 |
| 2,446,451 A | * | 8/1948 | Allen | 215/11.1 |
| 2,529,691 A | * | 11/1950 | McCarron et al. | 366/251 |
| 2,530,455 A | * | 11/1950 | Forss | 241/282.2 |
| 2,667,339 A | * | 1/1954 | Presley et al. | 366/204 |
| 2,712,926 A | * | 7/1955 | von Elm | 366/250 |
| RE24,607 E | * | 2/1959 | Seyfried | 192/55.2 |
| 2,940,738 A | * | 6/1960 | Posener et al. | 366/205 |

(Continued)

FOREIGN PATENT DOCUMENTS

| | | |
|---|---|---|
| FR | 2 442 034 | 6/1980 |
| JP | 53-37431 | 10/1978 |

(Continued)

*Primary Examiner* — David Sorkin
*Assistant Examiner* — Abbas Rashid
(74) *Attorney, Agent, or Firm* — Nixon & Vanderhye P.C.

(57) ABSTRACT

A method of preparing a blended food product includes the steps of: introducing a composition of food product(s) into a container, providing a closure for the container, the closure carrying an impeller; inverting the container so that the closure with its blending element lies lowermost; and driving the blending element to blend the composition to form a blended food product. Prior to blending, the container is mounted in a holder and clamped in place between the closure and the holder, to prevent leakage during blending. The holder may be in the form of a sleeve. A drive master is also provided for use with two sets of blending lids.

17 Claims, 15 Drawing Sheets

(56) References Cited

U.S. PATENT DOCUMENTS

| | | | | |
|---|---|---|---|---|
| 2,992,715 A * | 7/1961 | Blachly | | 192/69.71 |
| 3,154,123 A | 10/1964 | Tomlinson | | |
| 3,216,473 A * | 11/1965 | Dewenter | | 241/167 |
| 3,297,308 A * | 1/1967 | Philipps | | 366/266 |
| 3,704,864 A * | 12/1972 | Lee | | 366/205 |
| 3,738,619 A | 6/1973 | Shirae | | |
| 3,785,579 A * | 1/1974 | Voglesonger | | 241/282.1 |
| 3,786,999 A * | 1/1974 | Cabell | | 241/282.1 |
| 3,881,705 A * | 5/1975 | Greenspan | | 241/282.2 |
| 4,487,509 A * | 12/1984 | Boyce | | 366/199 |
| 4,708,487 A * | 11/1987 | Marshall | | 366/206 |
| 4,872,764 A * | 10/1989 | McClean | | 366/251 |
| 5,720,552 A * | 2/1998 | Schindlegger | | 366/197 |
| 5,797,313 A * | 8/1998 | Rothley | | 99/483 |
| 5,882,113 A * | 3/1999 | Binder | | 366/146 |
| 6,071,006 A * | 6/2000 | Hochstein et al. | | 366/247 |
| 6,331,070 B1 * | 12/2001 | Desai | | 366/197 |
| 6,338,569 B1 * | 1/2002 | McGill | | 366/144 |
| 6,736,538 B2 * | 5/2004 | Bittner | | 366/199 |
| 6,817,750 B1 * | 11/2004 | Sands | | 366/205 |
| 7,063,009 B2 * | 6/2006 | Lin | | 99/492 |
| 7,066,640 B2 * | 6/2006 | Sands | | 366/205 |
| 7,476,018 B2 * | 1/2009 | McGill et al. | | 366/197 |
| 7,938,574 B2 * | 5/2011 | McGill | | 366/199 |
| 2002/0176320 A1 * | 11/2002 | Wulf et al. | | 366/205 |
| 2005/0047272 A1 * | 3/2005 | Sands | | 366/199 |
| 2005/0068847 A1 * | 3/2005 | Sands | | 366/205 |
| 2006/0039235 A1 * | 2/2006 | McGill et al. | | 366/279 |
| 2006/0198241 A1 * | 9/2006 | Krishnachaitanya et al. | | 366/205 |
| 2006/0209627 A1 * | 9/2006 | McGill | | 366/205 |
| 2009/0109793 A1 * | 4/2009 | Xue | | 366/205 |

FOREIGN PATENT DOCUMENTS

| | | |
|---|---|---|
| WO | WO 99/21466 | 5/1999 |
| WO | WO 2004/002281 | 1/2004 |
| WO | WO 2005/070271 | 8/2005 |

\* cited by examiner

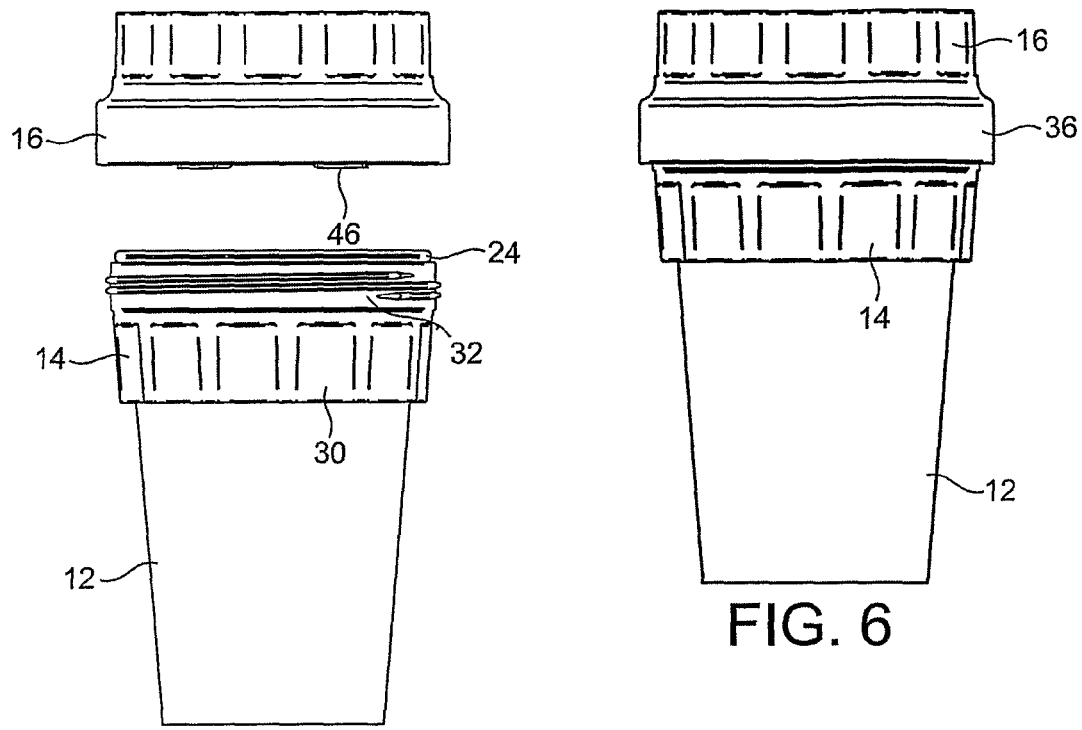
FIG. 5
FIG. 6
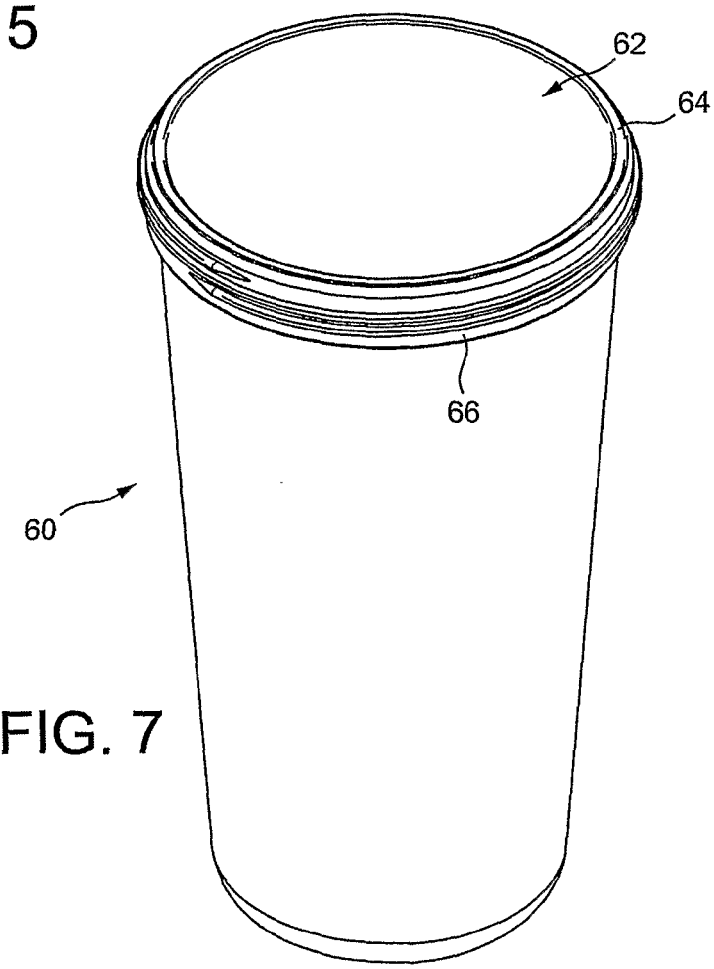
FIG. 7

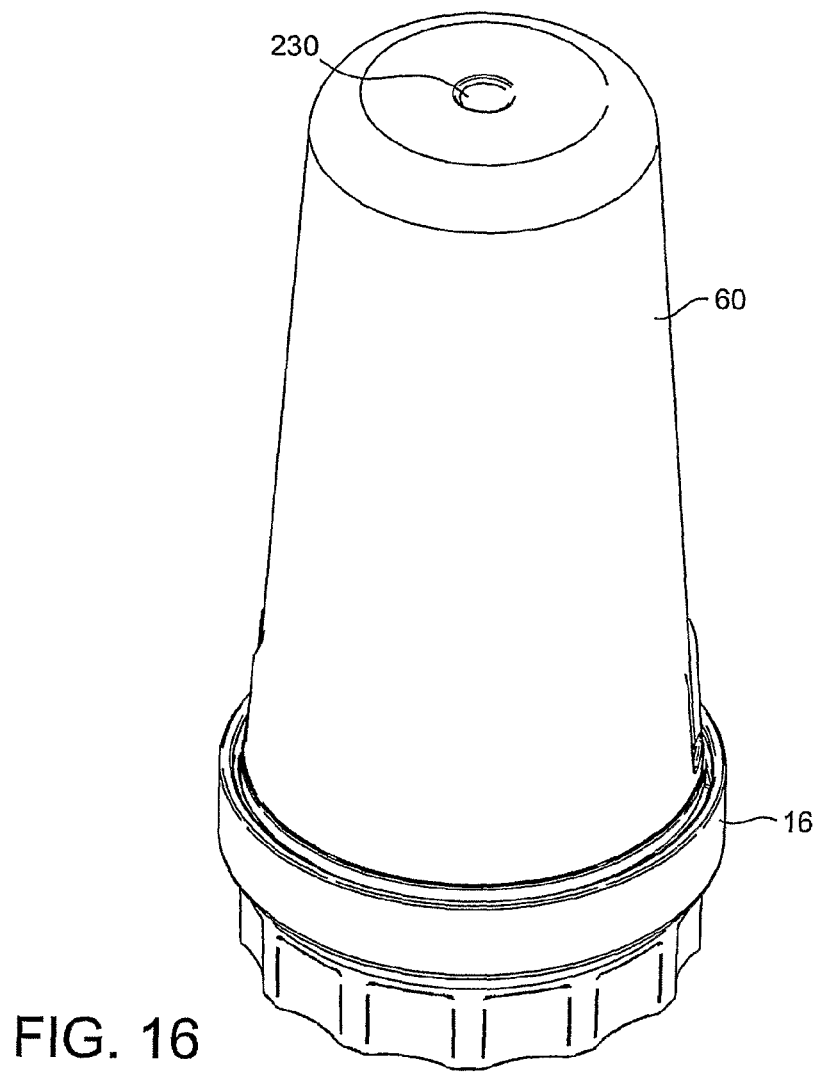
FIG. 16
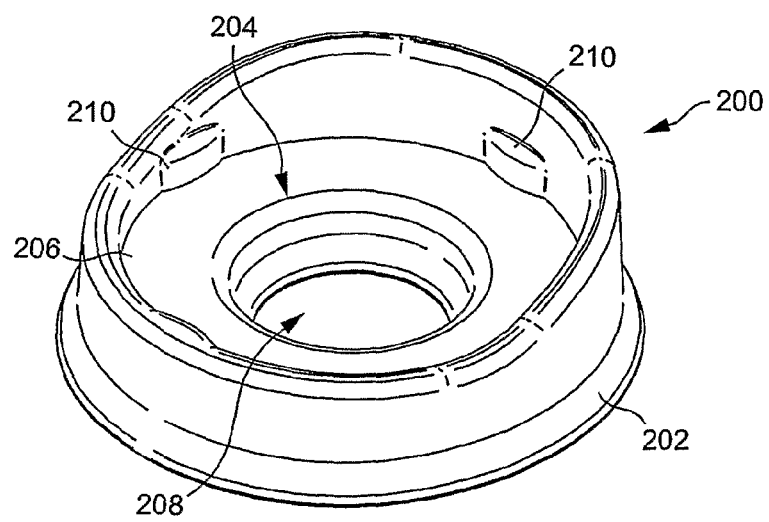

BLENDING ASSEMBLY

This application is the U.S. national phase of International Application No. PCT/GB2006/001945 filed 26 May 2006 which designated the U.S. and claims priority to Great Britain Patent Application No. 0510767.7 filed 27 May 2005 and Great Britain Patent Application No. 0517194.7 filed 22 Aug. 2005, the entire contents of each of which are hereby incorporated by reference.

This invention relates to a blending assembly and in particular, but not exclusively, to an assembly for blending food product within a container, as well as to a method of using the blending assembly, and to a lid and/or a drive member for such blending assemblies.

It has been proposed to blend food product within a container when preparing, for example, milkshakes, in which a blending element is carried on a lid for the container, and wherein the container is inverted and the blending element is driven to cause the contents to be blended. Examples of such assemblies are described in International patent applications WO 99/21466, WO 2004/002281, WO 2005/013787 and WO 2005/070271.

In such cases, especially for liquid based blending applications, it is desirable that the lid fits tightly with the container, so as to not be readily displaced when inverting or everting the container after or prior to blending, to prevent spillage. Even relatively minor tolerances between the lid and the container may result in leakage, particularly in response to pressures within the container during blending. It will be appreciated that such leakage is undesirable.

An object of the invention is to provide improvements for such blending assemblies.

According to one aspect of the invention there is provided a blending assembly comprising a container having an open end for receiving food product to be blended, a holder for receiving the container, the holder being configured to support the container therein, and a closure for the open end of the container, the closure carrying a rotatable blending element for blending product within the container, wherein the container is devoid of any means for positive interdigitation with the closure or a blending location, and wherein the holder and closure are arranged for clamping engagement about the open end of the container for sealingly securing the closure on the container for the purpose of a blending operation.

For this aspect of the invention, the container is preferably of the kind commonly associated with fast-food vending of coffee, milkshakes and other soft drinks, i.e. a relatively flimsy, thin walled cup, pot or beaker type container, typically made from paper or card type material, of the kind which will be familiar to patrons of fast-food restaurants and the like. Such containers are easily crushable by hand.

As will be appreciated by persons familiar with fast-food environments, the open end of such a container is devoid of any positive interdigitation feature for interlocking with a lid or other closure for said open end. In particular, according to this aspect of the invention, the upper end of the container is devoid of any screw thread or bayonet type formation or the like for locking interengagement with a lid/closure. Furthermore, according to this aspect of the invention, the lower end of the container is preferably devoid of any positive interdigitation means for securing the container on a blending location or the like.

As such, it will be immediately apparent that the container according to this aspect of the invention is clearly distinguished from a standard blending jug-type container of the kind commonly used with domestic food blending or food processing appliances, which typically includes a base having means for locking engagement of the jug in an upright manner on a blending unit, and possibly also means for directly securing a closure onto the open end of the container, for example a screw thread or clip.

This aspect of the invention is advantageous in that the holder and closure combination is able to cooperate to form a seal about the open end of the container, thus avoiding leakage from the container during blending or if the container is inverted, for example.

The invention allows for the easy removal of the closure from the container after blending, so that consumption of the product can be easily achieved through the open end of the container, e.g. by using a spoon or straw, or by drinking over the rim of the open end of the container.

The container can be easily released from the assembly by decoupling the closure from the holder, and then lowering the container into engagement with a work surface or projection or the like, so as to push the container upwards and out of engagement with the holder.

Additionally or alternatively, the holder may incorporate at least one aperture in a side thereof, through which the container can be directly engaged by a user for pushing the container upwards and out of the holder. Conveniently, diametrically spaced apertures may be provided in the holder. This may be useful in enabling a user to utilise his or her thumbs to urge the container upwards relative to the holder, whilst his or her fingers retain the holder in a secure position, for example. The or each aperture is preferably spaced from the open end or rim of the container, so as to avoid the risk of direct contact with the rim of the container by a user during removal of the container from the holder.

Conveniently, the open end of the container may include a radial projection for clamping between the holder and the closure. In a preferred embodiment, the container includes a circumferential lip extending radially outwards, for clamping between the holder and the closure. Such a projection does not constitute a "positive interdigitation feature" of the container, however.

In the most preferred embodiments, the container is in the form of a standard cup or tub of the kind used commonly for vending coffee, tea, milkshakes and other soft drinks, comprising a disposable beaker-type container made from thin walled, crushable paper, board or plastic material, having an out-turned lip about its open end, the container typically having a slight outward taper from its base upwards and being devoid of any external handles.

The holder is configured for supporting the container and, to that end, may include an axial bearing surface for abutment with a portion of the container, so that the container can rest supportedly on the bearing surface. The bearing surface is preferably configured for supporting the underside of the lip on the most preferred embodiments of container, so that the container can be freely suspended on the holder.

In a first embodiment, the holder is in the form of annular ring into which the container can be located, whereas in a further embodiment the holder is in the form of a sleeve for the container.

The holder may be configured for supporting the side(s) of the container, and to that extent the holder is preferably configured to nest or fit snugly around the body of the container, and may further include a portion which extends over the base of the container.

In a preferred embodiment, the holder has an internal diameter configured to fit tightly around, in particular, an upper region of the container, for example the region into which the blending element on the closure extends, in use. This can reduce the risk of twisting forces being transferred to the container during blending, which might otherwise lead to deformation of the container and, hence, leakage.

The holder may be configured to support a significant proportion of the length of the container, not only the upper region adjacent its open end. To that extent, the holder may comprise a sleeve or cup into which the whole container can be nested, such that all or most of the external surface of the container is located within the sleeve or cup, preferably in snug fitting, yet removable, abutment with the interior of the holder. This can be of particular advantage in reducing the risk of deformation to the sides of the container during blending, particularly in situations where ice cubes or other solid items are being blended within the container, which might otherwise deform the container through impact with the internal surface of the container during blending.

The holder may further include formations for operative engagement with complimentary formations on the closure, for coupling the two together. Preferably, the holder includes a threaded outer profile for engagement with complimentary threaded formations on the closure. Alternatively, a bayonet type fitting or other positive interdigitation feature may be provided on the holder, for engagement with a complimentary feature on the closure. In another embodiment, the closure and holder may be hingedly connected or hingably couplable to one another. Of course, other methods or means of coupling the closure and holder for sealing the container are within the contemplation of the invention.

An outer surface of the holder and/or the closure is preferably crenelated.

A seat may be provided for receiving the inverted assembly, the seat defining a recess and/or bearing surface for receiving the upper end of the closure. Complimentary stops may be provided between the seat and closure or holder, for preventing relative rotation between the assembly and its seat. This can also be of advantage in reducing the risk of twisting forces being transferred to the container during blending, which might otherwise lead to deformation of the container and, hence, leakage.

According to a further aspect of the invention there is provided a method of preparing a blended food product including the steps of: providing a container having an open end for receiving food product to be blended, introducing a composition of food product(s) into a container through the open end thereof, providing a holder for receiving the container, the holder being configured to support the container therein, introducing the container into the holder prior to or after introduction of the composition into the container, the composition being selected according to the required blended food product, providing a closure for the open end of the container, the closure carrying a rotatable blending element for blending product within the container, clamping the holder and closure about the open end of the container for sealingly securing the closure on the container for the purpose of a blending operation, inverting the assembly so that the closure with its blending element lies lowermost; locating the assembly at a blending location and driving the blending element to blend the composition within the container to form a blended food product.

Preferably, the assembly is held in place on a seating at the blending location where is located means for rotatably driving the blending element carried by the closure. Conveniently, the assembly may be held in place using manual pressure. However, in a preferred method, the assembly is held in place using mechanical pressure, for example by a powered restraining member movable for clamping the assembly on the seating during blending. The restraining member is preferably configured to engage the upturned end of the container, and/or the upturned end of the holder, and/or the upturned end of the closure.

According to a further basic aspect of the invention, there is provided a blending assembly comprising a container for receiving food product to be blended, a holder for the container, and a closure for the container, wherein the holder and closure are arranged for co-operatively sealing the container for the purpose of a blending operation.

Conveniently, a rotatable blending element may be carried by the closure. Alternatively, the assembly may include a first closure and a second closure, the first closure being adapted for engagement with the holder and the second closure being configured to be received on the container beneath the first closure.

In such an embodiment, the rotatable blending element may be carried by the second closure, and the first closure may include means for driving engagement with the rotatable blending element on the second closure.

According to yet a further aspect of the invention, there is provided a blending assembly comprising a container for receiving food product to be blended, a holder for receiving the container, and a closure for the container, wherein the holder and closure are arranged for clamping engagement with the container for sealingly securing the closure on the container for the purpose of a blending operation, wherein the closure is adapted for engagement with the holder and wherein the assembly includes a further closure configured to be received on the container beneath the first closure.

According to a further basic aspect of the invention, there is provided a blending assembly comprising a container for receiving food product to be blended, a holder for the container, and a closure for the container, wherein the holder and closure are arranged for co-operatively sealing the container for the purpose of a blending operation, wherein the closure is adapted for engagement with the holder and wherein the assembly includes a further closure configured to be received on the container beneath the first closure.

Preferably, the rotatable blending element is carried by the further closure.

More preferably, the first closure includes means for driving engagement with the rotatable blending element on the further closure.

According to a still further aspect of the invention, there is provided a method of preparing a blended food product includes the steps of: introducing a composition of food product(s) into a container through an open portion thereof, the composition being selected according to the required blended food product; providing a closure for the container, the closure carrying a rotatable blending element; inverting the container so that the closure with its blending element lies lowermost; and driving the blending element to blend the composition to form a blended food product, characterised in that, prior to blending, the container is mounted in a holder and clamped or otherwise sealed in place between the closure and the holder.

It will be appreciated that the assembly can be inverted manually or automatically. More particularly, it will be appreciated that the assembly of the invention is readily adapted for use on the same kind of blending machines as used for containers having disposable lids, for example as described in WO 99/21466, WO 2004/002281, WO 2005/013787 and WO 2005/070271, which are incorporated herein by reference.

According to another aspect of the invention there is provided a drive master for a blending assembly, the drive master defining an axis of rotation, and comprising first and second drive arrays, wherein the first drive array differs in configuration from the second drive array, for use in operative driving engagement with correspondingly formed first and second rotatable drive slaves.

In the case of a lids for containers of the kind referred to above, the lids have a rotatable drive slave, that is to say a rotatable member which is intended to be rotatably driven, in use, for rotating the blending element and thereby causing blending to occur in the container. If the lid is intended to be supplied as a reusable item, i.e. for use in a number of successive blending operations on one or more containers, it may be advantageous for the drive slave to a have a different design from the drive slave of a single use, disposable lid, i.e. for use in only a single blending operation on a single container, before being disposed of. For example, the cumulative pressures and associated wear that occur with successive blending operations may dictate that the drive slave of a re-usable lid needs to be of a more substantial structure than the drive slave of a single use, disposable lid.

This aspect of the invention is therefore advantageous in that it provides a drive master, that is to say a rotatable member which is located external and separate from the lid and container, which is coupled to a drive motor for driving the blending element on the lid, in use, wherein the drive master can be used with more than one type of drive slave. More particularly, the drive master is advantageous in that it can be fitted to a drive motor and used for blending with more than one form of blending lid. For example, first and second lids, for example a single use lid and a multi-use lid, each having a different form of drive slave, can be used interchangeably on the drive master.

In a preferred embodiment, the first and second drive arrays on the drive master are radially offset from one another about the axis of rotation. The first drive array may comprise a generally circular array defining an outer diameter, and the second drive array may comprise a generally circular array defining an inner diameter, wherein the inner diameter of the second drive array is equal to or greater than the outer diameter of the first drive array.

The first and second drive arrays may be offset from one another along the axis of rotation.

Conveniently, the drive master may comprise a body, wherein the first and second drive arrays are integrally formed on the body.

In a preferred embodiment, the drive master comprises a body, wherein the first drive array is arranged substantially above the second drive array. In particular, the drive master may comprise a body, wherein the first and second drive arrays each define an upper plane, and wherein the first drive array is provided above the upper plane of the second drive array.

Preferably, the first array comprises a plurality of first drive teeth, and the second array preferably comprises a plurality of second drive teeth.

The drive master may conveniently comprise a body which is adapted to be mounted on the drive shaft of a drive motor, and may include a recess for receiving a drive shaft of a drive motor.

The drive master is preferably disc shaped.

It will be appreciated that the drive master may include more than two drive arrays, for example three or four drive arrays, for interchangeable use with a corresponding number of complimentarily arranged drive slaves, for example on three or four blending lids having different drive slaves.

According to another aspect of the invention, there is provided a blending assembly comprising:

a first container having a first lid, the first lid carrying a first rotatable blending element, and having a first drive slave arranged for rotation with the first blending element;

a second container having a second lid, the second lid carrying a second rotatable blending element, and having a second drive slave arranged for rotation with the second blending element; and a drive master defining an axis of rotation, the drive master being configured for respective operative engagement with the first and second drive slaves for driving a respective blending element;

wherein the first drive slave differs in configuration from the second drive slave.

In a preferred embodiment, the first drive slave includes a first slave array disposed at a first radial spacing relative to the axis of rotation of the drive master, and the second drive slave includes a second drive array, disposed at a second radial spacing relative to the axis of rotation of the drive master.

More particularly, the first slave array preferably defines an outer diameter relative to the axis of rotation of the drive master, and the second slave array preferably defines an inner diameter relative to the axis of rotation of the drive master, wherein the inner diameter of the second slave array is equal to or greater than the outer diameter of the first slave.

The drive master preferably includes a first drive array configured for operative engagement with the first drive slave, and a second drive array configured for operative engagement with the second drive slave.

According to another aspect of the invention, there is provided a lid for a container, the lid carrying a rotatable blending element depending from its underside, wherein the lid defines a planar upper surface, and wherein the blending element defines a complimentary planar surface for stackable engagement on the planar upper surface of a subjacent lid of the same form and structure, for creating a stack of said lids.

According to another aspect of the invention, there is provided a lid for a container, the lid comprising:
a body to act as a closure for a container,
a rotatable drive slave for operative engagement with a drive master, and
a blending element for blending food product within a container to which the lid has been fitted, the lid being coupled for rotation with the drive slave assembly,
wherein the body comprises a first plastics material, the drive slave comprises a second plastics material, and wherein the second plastics material has a greater wear resistance than the first plastics material.

Other features and aspects of the invention will be readily apparent from the claims and the following description of embodiments of the invention, given by way of example only, with reference to the drawings, in which:

FIG. 5 shows the blending assembly of FIG. 1 in a part-assembled state;

FIG. 6 shows the blending assembly of FIGS. 1 and 5 in an assembled state;

FIG. 7 is a perspective view of a second holder for use in another preferred embodiment of the invention;

FIG. 15 is a cross-sectional schematic view of the assembly shown in FIGS. 13 and 14, in an assembled state.

FIG. 16 is a schematic perspective view showing a seat for receiving an inverted container assembly;

Figure 1:
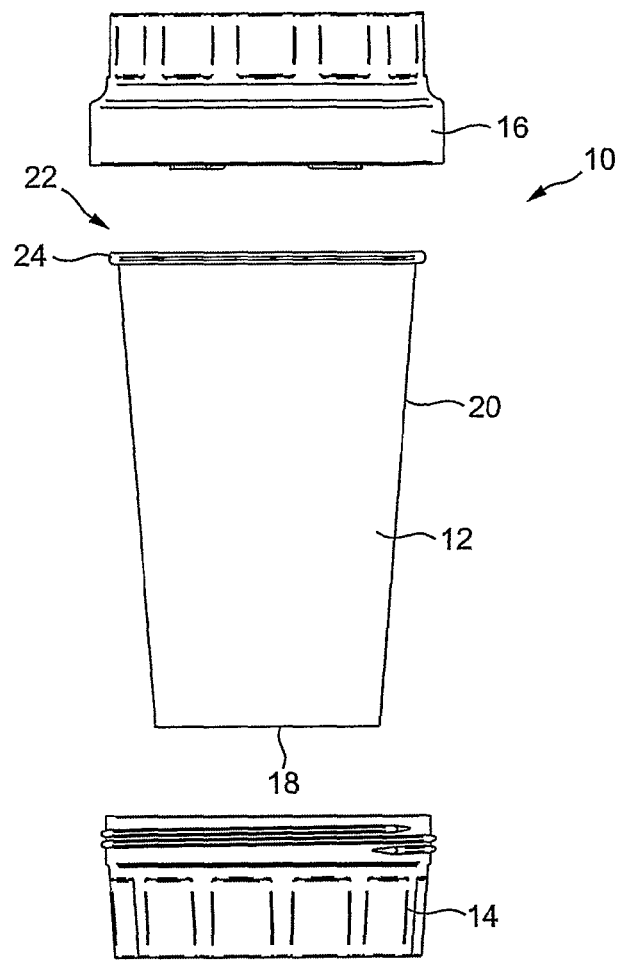
FIG. 1 shows an exploded view of a blending assembly according to a preferred embodiment of the invention.

Referring to the drawings and firstly to FIG. 1, a blending assembly is indicated generally at 10. The assembly 10 includes a container 12 for receiving product to be blended, such as milkshake and ice-cream type product, a holder 14 for receiving the container 12, and a lid 16 which acts as a closure for the container 12. As will be described in more detail below, the container 12 is intended to be clamped or otherwise sealingly secured between the holder 14 and the lid 16, in particular for the purpose of a blending operation.

The container 12 is in the form of a cup having a base 18 and side walls 20 which are tapered outwardly away from the base 18 to form an open upper end 22. The container 12 includes a radial flange type projection in the form of an out-turned lip 24, which is arranged about the periphery of the upper end 22.

In accordance with this preferred embodiment, the container is devoid of any positive interdigitation features, either adjacent its base 18 or its open end 22, such as a screw thread or bayonet type fitting, or any other form of fixing device specifically adapted to directly interlock with the open end of the container for securing a lid directly to the container, or to directly interlock the base 18 on a blending location. It is essential that this is appreciated when considering the type of container encompassed by this preferred embodiment of the invention.

Figure 2:
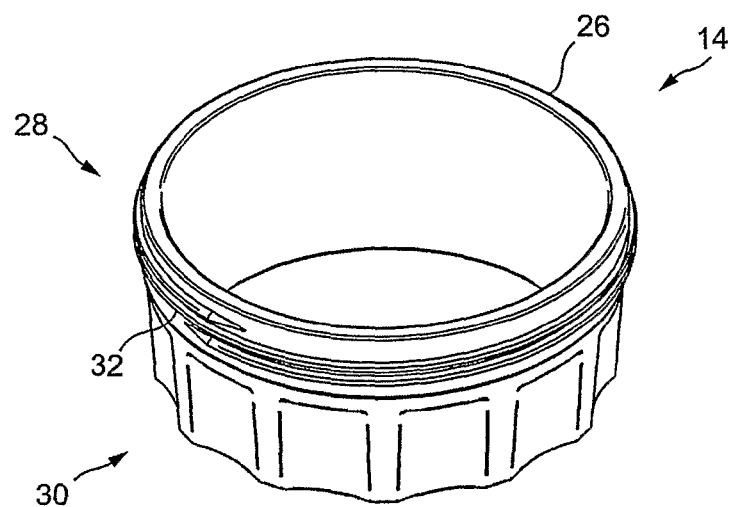
FIG. 2 is a perspective view of a holder of the assembly shown in FIG. 1.

Referring to FIG. 2, the holder 14 is in the form of annular ring or collar type member having an internal diameter which is configured to fit tightly or snugly around an upper region of the container 12.

The upper end of the holder 14, as viewed in FIG. 2, defines an axial face or bearing surface 26 which is intended to abut against the underside of the lip 24 on the container 12, in use.

The outer surface of the holder 14 defines first and second regions 28, 30. A first region 28, adjacent the upper end of the holder 14 as viewed in FIG. 2, is provided with a threaded profile 32, for threaded engagement with complimentary formations on the lid 16, as will be described below. A second region 30, below the first region as viewed in FIG. 2, is generally crenelated so as to define peak and trough type formations which assist the user in turning the holder 14, during assembly for example.

Figure 3:
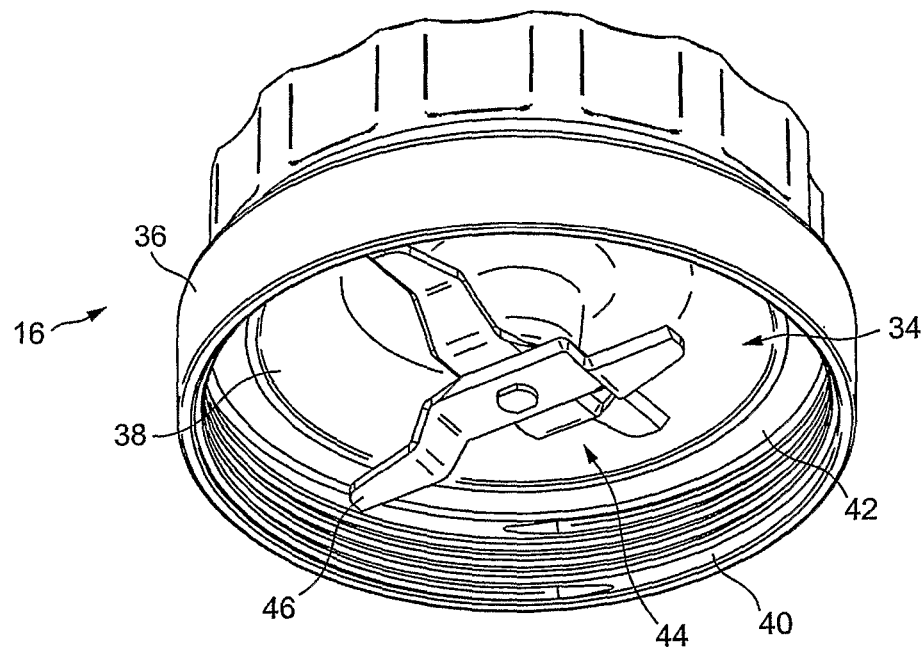
FIG. 3 is a perspective view of the underside of a closure of the assembly shown in FIG. 1.
Figure 4:
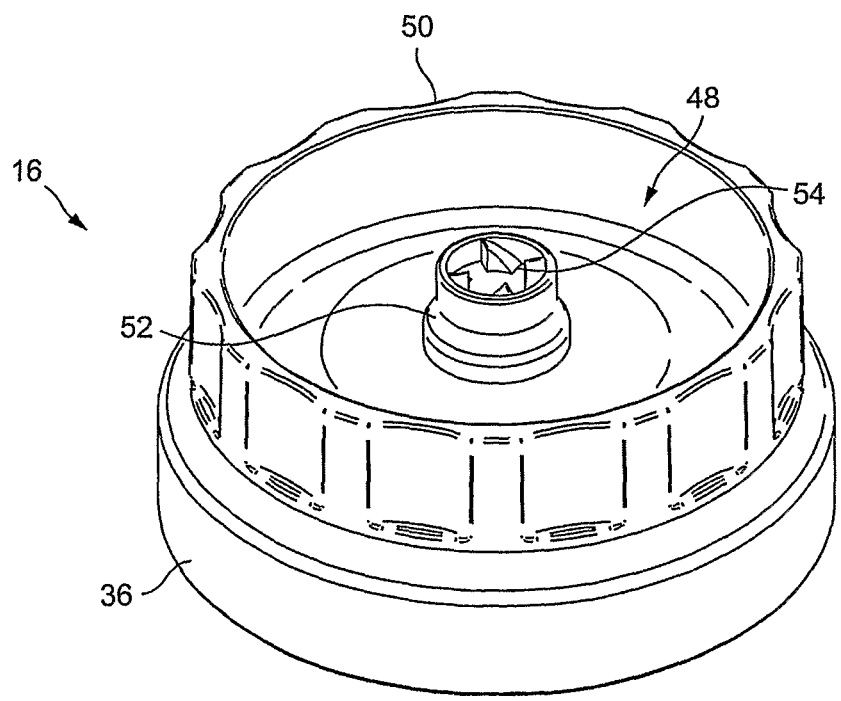
FIG. 4 is a perspective view of the upper side of the closure shown in FIG. 3.

The lid 16, which is shown in more detail in FIGS. 3 and 4, is configured to form a closure for the open end 22 of the container 12.

The underside of the lid 16 includes a concavity 34 defined by a circular wall 36 and a base 38 therebetween. A threaded formation 40 is provided on the internal surface of the wall 36 for engagement with the thread profile 32 on the holder 14, as mentioned above.

An outer peripheral region 42 of the base 38 is substantially planar and is intended to provide an axial bearing surface for being brought into sealing abutment with the open end 22 of the container 12, in use, as will be described below. The lid 16 may include a gasket or like seal member at region 42. This can be in the form of a removable element or can be formed integrally with the lid 16, for example by a two-shot moulding process. An integral seal member may be preferable for reducing or obviating the number of required sanitation operations, in particular if the lid is to be re-used.

A blending element 44 is mounted on the underside of the lid 16 for driving engagement with external drive means, as will be described below. The blending element 44 includes rotatable blades 46 which are arranged so as to extend into the body of the container 12, in use, for blending product in the container 12.

The upper end of the lid 16 defines an upper concavity 48 including a generally circular wall 50, off-set inwardly from the wall 36 on the underside of the lid 16. The outer surface of the wall 50 is generally crenelated so as to define peak and trough type formations which assist the user in turning the lid 16, during assembly for example.

A tubular shaft 52 extends up from the centre of the upper concavity 48. The shaft 52 is includes a rotatable drive connection 54 in communication with the blending element 44, which is configured for receiving the drive shaft of a motor, for driving the blending element 44 in a rotary manner.

An example of a method of making a blended product using the assembly 10, includes the following steps:

A container 12 is charged with a composition of food product(s) which may include various component ingredients which are dependent upon the eventual blended product required.

For example, a milkshake or ice cream product which may include:— skimmed milk powder
vegetable fats
aspartame
tara gum
xanthan gum emulsifier
hydrolysed wheat gluten
instant modified starch
colouring agents
glucose syrup The composition is either located in the container 12 at a position remote from the blending location, or is placed in the container 12 at or close to the blending location in predetermined amounts, for example in powder or granulated form from sachets or other packets of predetermined size.

Alternatively, a bulk dispensing unit for bulk composition in powder or granulated form may be used with manually or automatically operated volumetric feeding of portions of the composition into the container 12 at the blending point.

The container 12 is then charged with an ice containing fluid, which consists primarily of flavour neutral glucose syrup, water and ice at a temperature, for example, of around −3° C. for milkshake or around −8° C. for soft ice cream.

The container 12 is then positioned within the holder 14, in the manner shown in FIG. 5, wherein the bearing surface 26 at the upper end of the holder 14 is in abutment with the underside of the lip 24 on the container 12.

The lid 16 is threadingly engaged with the holder 14, the two items being tightened so as to clamp the lip 24 of the container 12 between the bearing surface 26 on the holder 14 and the bearing surface 42 on the underside of the lid 16. The assembly 10 is then suitably assembled (see FIG. 6) to carry out a blending operation, with the product to be blended sealed within the container/lid assembly.

In a preferred method, the assembly 10 is inverted to have the lid 16 lowermost. The container 12 is then mounted on a seating (not illustrated) with the blending element 44 drivingly connected to a motor driven shaft, for example of the kind described in WO 99/21466, PCT/GB03/02799 or PCT/GB2005/000235.

The container 12 is then held in position on the seating during operation of the drive shaft, to drive the blending element 44 and thereby produce a blended product within the container 12.

Flavouring and other additives such as nuts, chocolate can be added at various stages including, before blending, after blending, and after removal from the container.

After blending, the container 12 is removed from engagement with the seating and drive means and everted to its original upright position. In a preferred method, the holder 14 and lid 16 are then unscrewed, so that the container 12 can be removed from the holder 14, for consumption of the blended product.

Further additions to the product may be made after the lid 16 has been removed which include, for example, chocolate pieces, nuts, fruit or other items.

Referring now to FIG. 7, an alternative form of holder for use with the invention is indicated at 60. In this embodiment, the holder 60 is in the form of a jug or like vessel having an open end 62. The internal configuration of the holder 60 is designed to correspond generally with the outer configuration of the container 12 described above, so as to form a snug fitting sleeve around the container 12, in use.

The open end 62 of the holder 60 defines an axial face or bearing surface 64 which is intended to abut against the underside of the lip 24 on the container 12, in use, in the same manner as the bearing surface 26 on the holder 14 described above.

Adjacent its open end 62, the outer surface of the holder 60 includes a threaded profile 66, for engagement with the threaded formations on the lid 16, substantially as described above.

Figure 8:
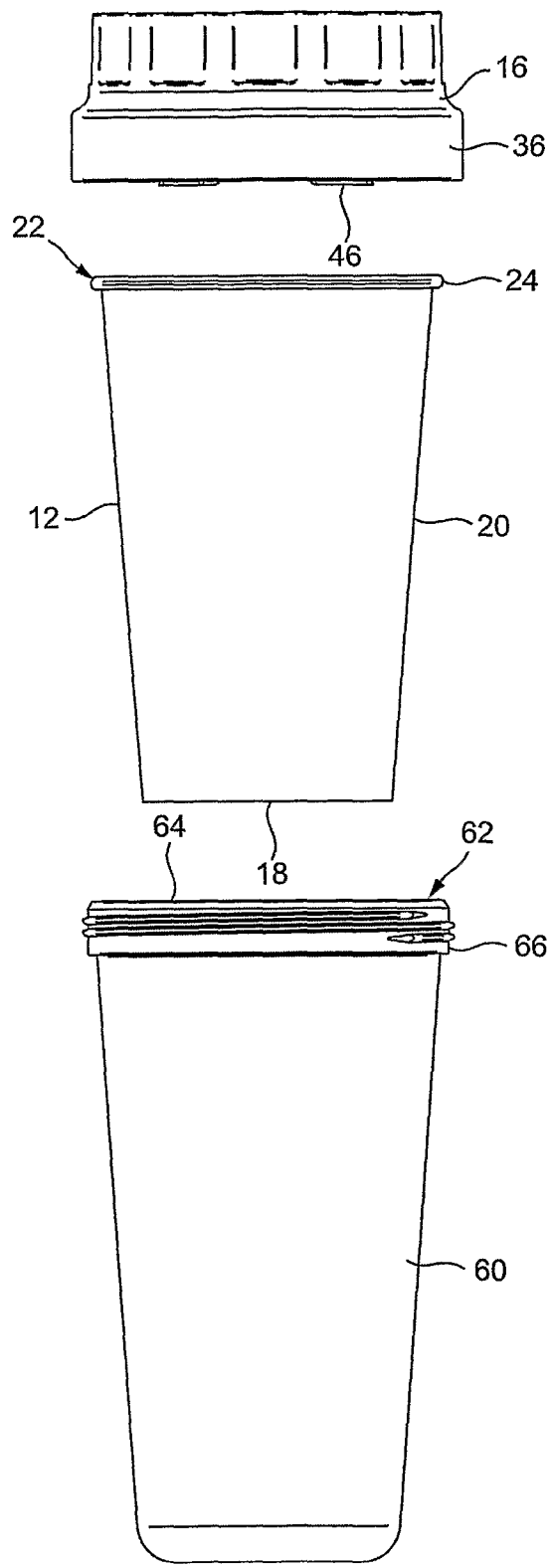
FIG. 8 shows an exploded view of a blending assembly according to a further preferred embodiment of the invention.
Figure 9:
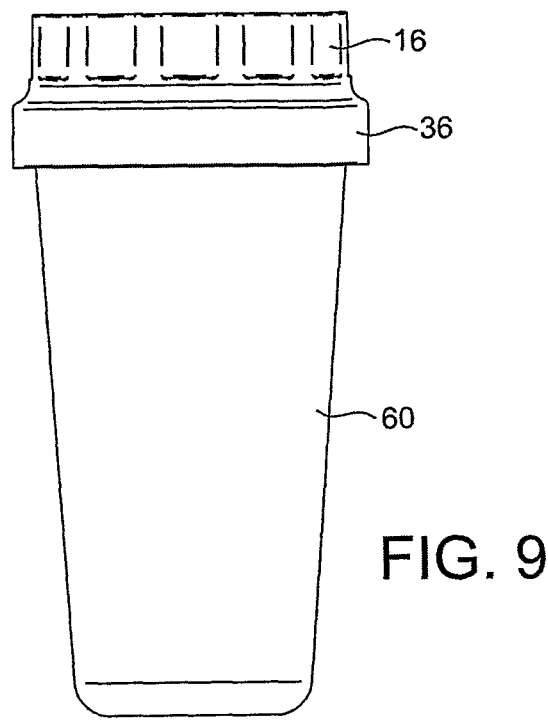
FIG. 9 shows the assembly of FIG. 8 in an assembled state.

The holder 60 is used in substantially the same manner as the holder 14, as follows:

Referring firstly to FIGS. 8 and 9, the container 12 is placed inside the holder 60, so that the bearing surface 64 is in abutment with the underside of the lip 24 on the container 12. The lid 16 is then threadingly engaged on the holder 60, to clamp the container 12 in place between the bearing surface 64 on the holder 14 and the lid 16. The assembly shown in FIG. 9 can then be inverted for a blending operation.

It should be noted that an aperture is formed in the base of the holder 60, for use in removing the container 12 from the holder 60 after a blending operation.

Figure 11:
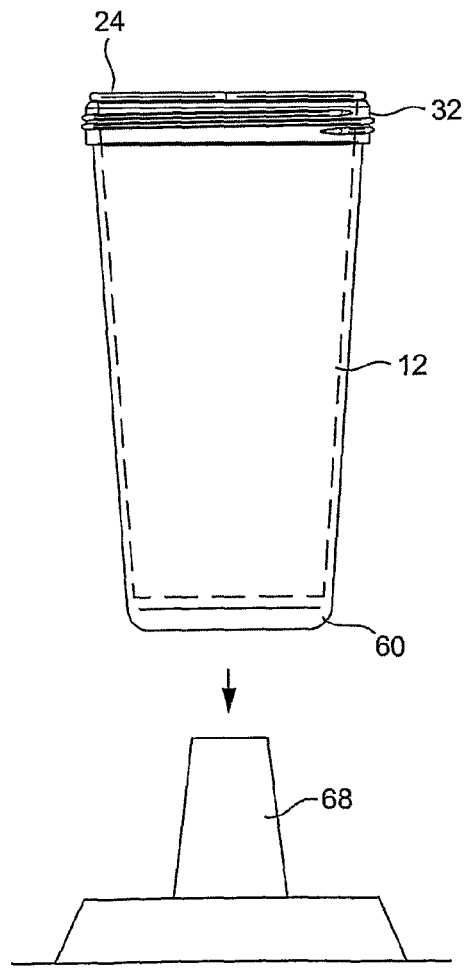
FIG. 11 shows a further stage of disassembly of the assembly shown in FIGS. 8 to 10.
Figure 12:
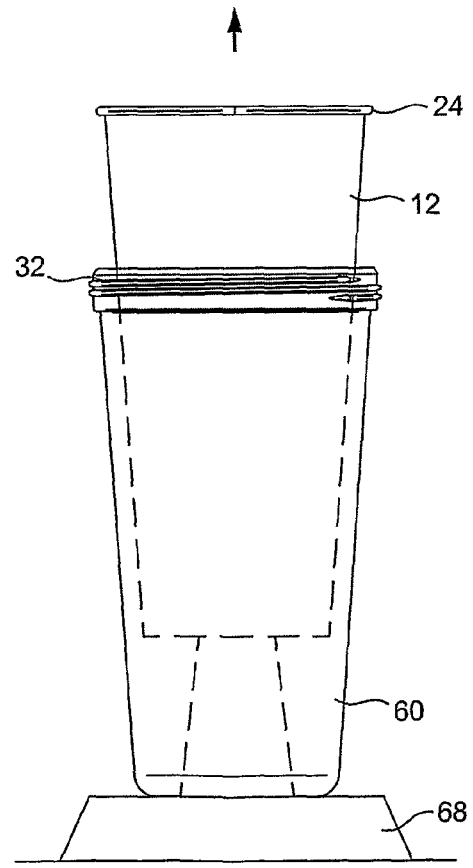
FIG. 12 shows a still further stage of disassembly of the assembly shown in FIGS. 8 to 11.

In a preferred method, the container 12 is removed from the holder 60 in the following manner, described with reference to FIGS. 10 to 12.

Figure 10:
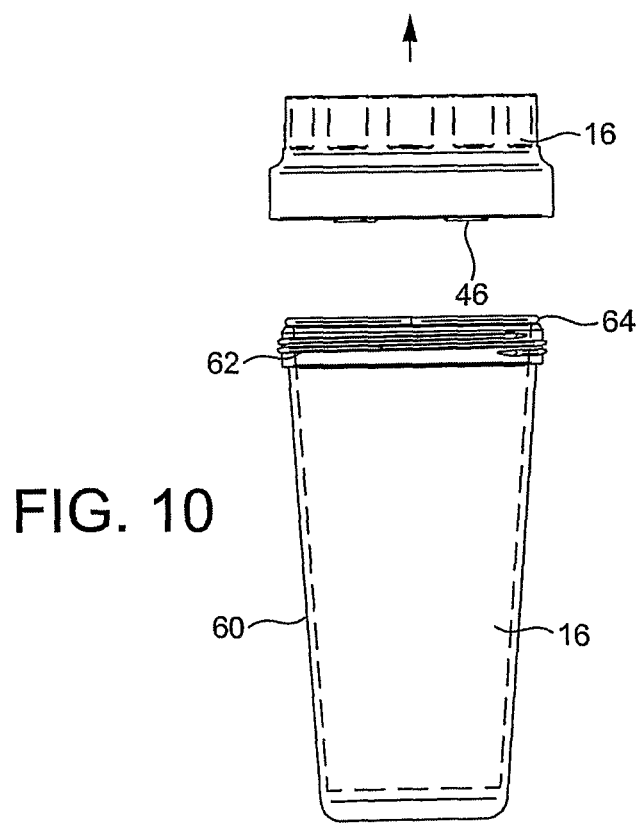
FIG. 10 shows a first stage of disassembly of the assembly shown in FIGS. 8 and 9.

Firstly, the lid 16 is unscrewed and removed from engagement on the holder 60 (see FIG. 10). The holder 60 is then positioned over a mandrel 68 or like projection positioned on a counter or the like, as shown in FIG. 11, and lowered so that the mandrel 68 extends through the aperture in the base of the holder 60. The mandrel 68 then comes into contact with the base of the container 12, to displace the container 12 upwards within the holder 60 (FIG. 12). Suitably displaced, the container 12 can then be removed easily from the holder 60.

Figure 13:
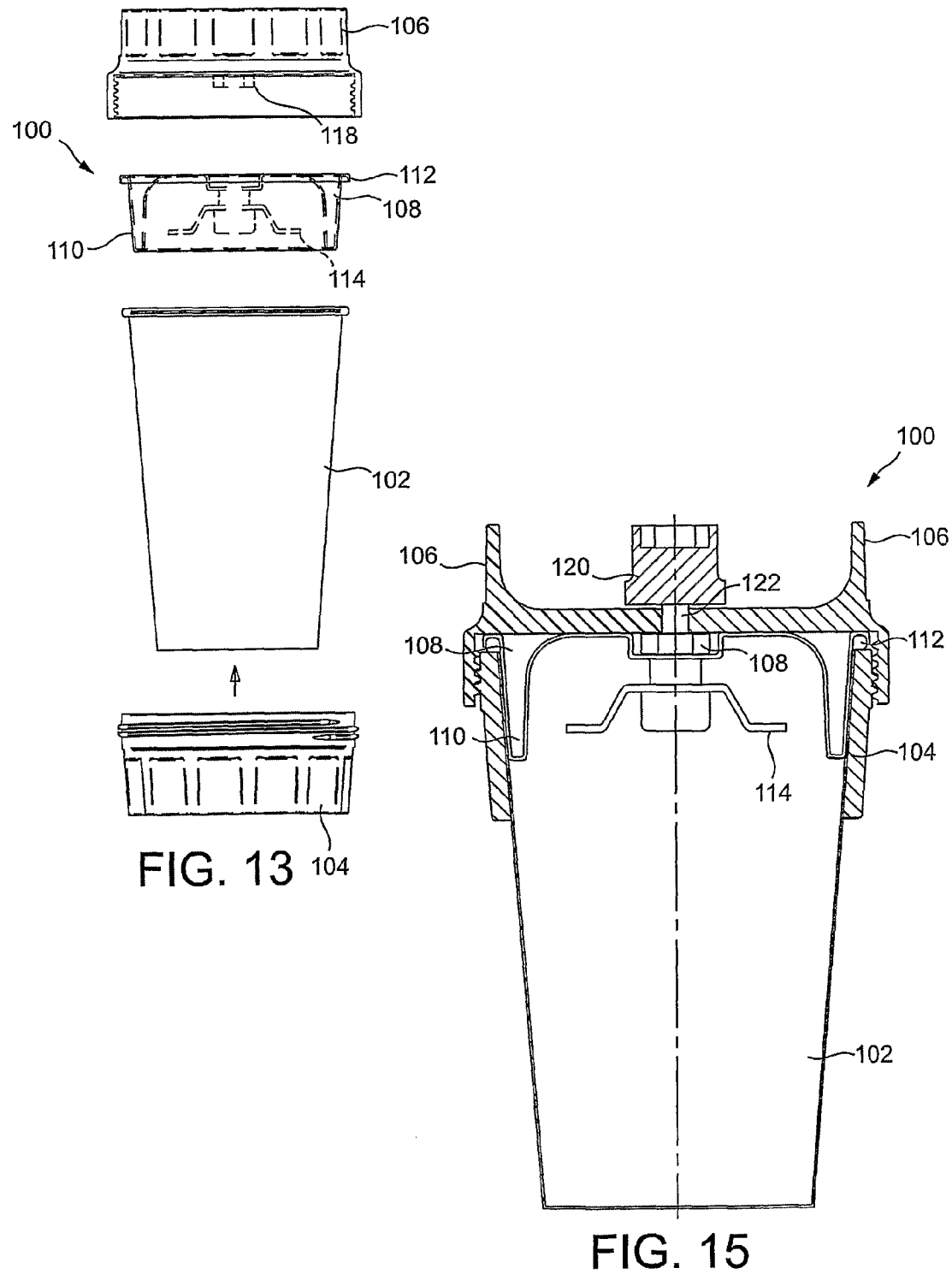
FIG. 13 shows a schematic part cross-sectional exploded view of a blending assembly according to a still further preferred embodiment of the invention.
Figure 14:
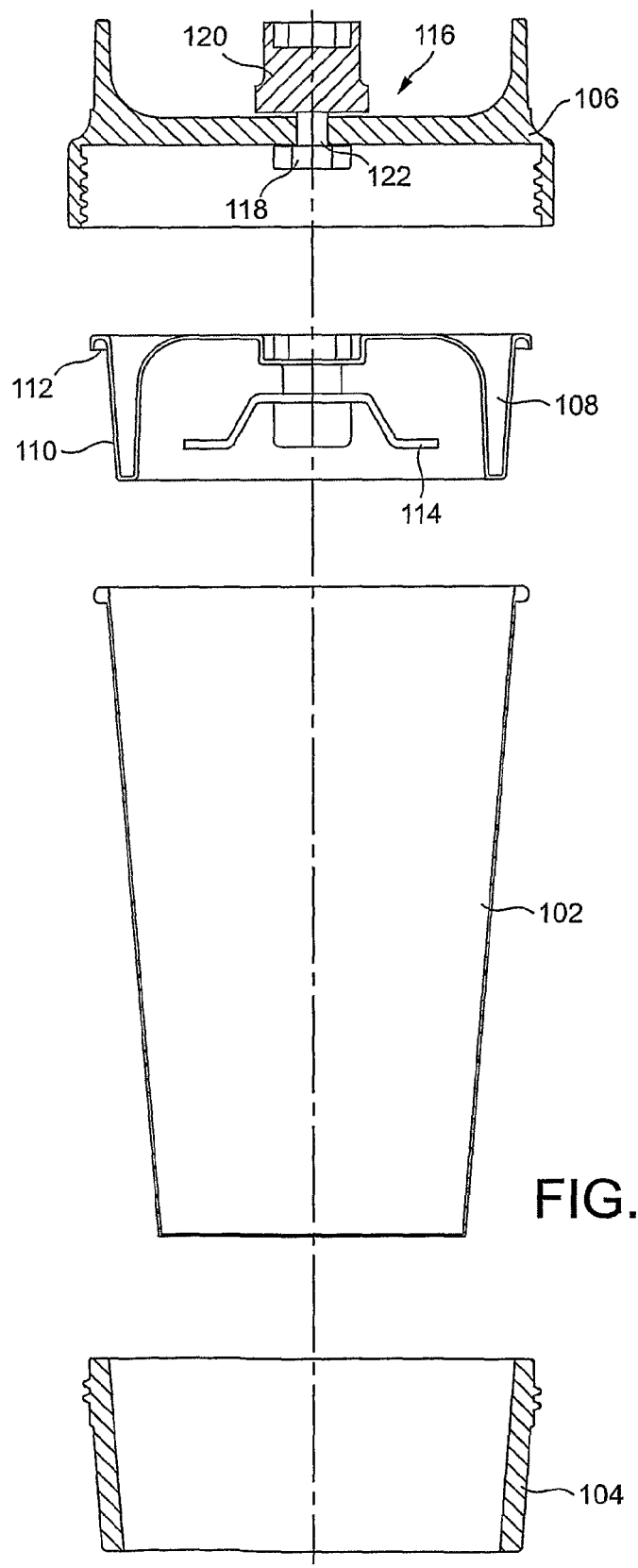
FIG. 14 is an enlarged cross-sectional view of a blending assembly shown in FIG. 13.

A further embodiment of an assembly according to the invention is illustrated in FIGS. 13 to 15, and indicated generally at 100.

The assembly 100 includes a container 102, which corresponds substantially with the containers 12 described above with reference to FIGS. 1 to 12. The assembly 100 also includes a holder 104, which corresponds substantially with the holder 14 described above with reference to FIGS. 1 to 6.

The assembly 100 also includes a first closure 108, which is configured to be received on the open end of the container 102, so as to effectively close the open end of the container 102. However, the closure 108 is configured to be received in loose fitting engagement with the open end of the container 102, so as to be easily removable.

The closure 108 includes a circular wall portion 110 having an outer taper which is generally complementary to the internal taper of the container 102. The closure 108 also includes a rim 112 which is configured to sit on the periphery of the open end of the container 102.

The closure 108 carries a rotatable blending element 114, which corresponds substantially with the blending element described above with reference to FIGS. 1 to 12.

The assembly 100 further includes a second closure or clamping lid 106, which corresponds substantially with the lid 16 described above with reference to FIGS. 1 to 12, but which has a number of important differences, described below.

In this embodiment, the clamping lid 106 does not carry a blending element. Instead, the lid 106 includes a dog drive 116 having a lower portion 118 and a upper portion 120, coupled to one another by a central shaft portion 122. The lower portion 118 is arranged and configured for driving engagement with a portion of the blending element on the closure 108. The upper portion 120 is arranged and configured to be rotatably driven by a drive motor shaft, substantially in the manner described with reference to FIGS. 1 to 12, for driving the lower portion and thereby rotating the blending element 114 on the closure 108.

In use, the container 102 is placed within the holder 104, so that the underside of the rim of the open end of the container 102 rests in abutment with the upper edge of the holder 104, so as to be supported thereon, substantially in the manner described with reference to FIGS. 1 to 12.

Then, or prior to that stage, the first closure 108 is arranged on the container 102, with the lower side of the rim 112 in abutment with the upper side of the rim on the container 102, as illustrated in FIG. 15.

With the container 102, holder 104 and first closure 108 so positioned, the clamping lid 106 is brought into threaded engagement with the holder 104, substantially as described with reference to FIGS. 1 to 6. This serves to clampingly secure the rim of the container 102 and the rim 112 of the first closure 108 in sealing engagement with one another, between the holder 104 and the lid 106. The assembly 100 can then be inverted, for blending product within the container 102, for example as described above with reference to FIGS. 1 to 12.

The assembly 100 can be easily disassembled by reversing the above procedure, as will be readily understood.

It should be further understood that the holder 104 can be substituted for any other holder described herein, such as the holder 60 of FIGS. 7 to 12.

Preferred embodiments of the invention are particularly advantageous for the handling of thin walled, flimsy, non-rigid containers, which are easily crushable by hand, wherein the holder is configured to provide support to the container for resisting twisting forces imparted during the blending operation or when inverting or everting the container, in the case of an embodiment incorporating a closure mounted blending element. In the embodiment of FIGS. 1 to 6 and 13 to 15, the ring-type holder provides support adjacent the open end of the container, whereas in the embodiment of FIGS. 7 to 12, the support is provided along the whole length of the container, for example.

The container assemblies illustrated or described herein can be inverted and engaged on a drive arrangement, in a preferred method of blending. In a further preferred method, an adaptor or seat may be removably fitted over the drive arrangement on a blending unit or machine for receiving the inverted assembly.

An example of such a seat is indicated generally at 200 in FIG. 16. The seat 200 has an annular body 202 which defines a concavity 204 having a central aperture 206. A bearing surface 208 is provided about said aperture 206, for receiving the lid of a container assembly.

Stop projections 210 are spaced around the seat 200 for engagement with the lid of a container assembly when mounted on the seat 200. Four or more equispaced projections are preferred, although two diametrically-opposite projections or three equispaced projections can be sufficient for certain applications. In this embodiment, the container assembly corresponds generally with the assembly of FIG. 8 and corresponding reference numerals have been used. As such, the shape of the stop projections 206 is configured to nest in the crenelated periphery of the container lid of FIG. 1.

Figure 17:
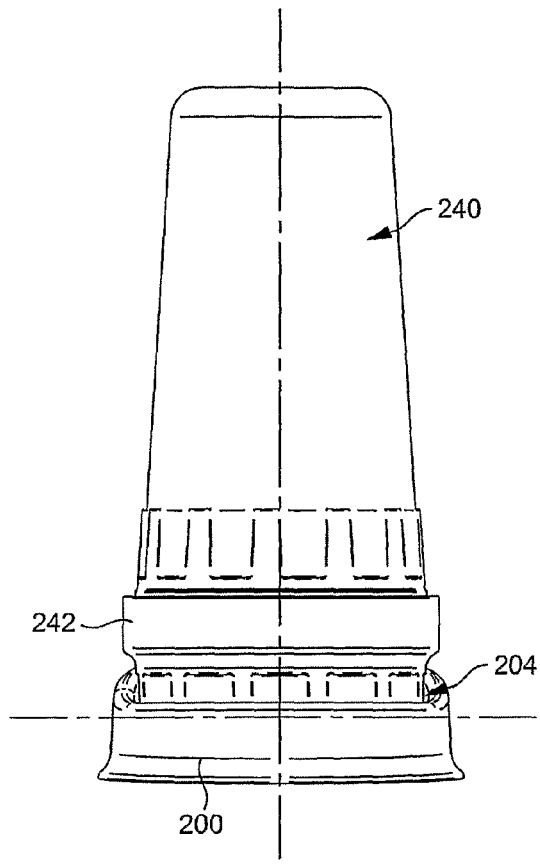
FIG. 17 shows a container assembly mounted on the seat of FIG. 16.
Figure 18:
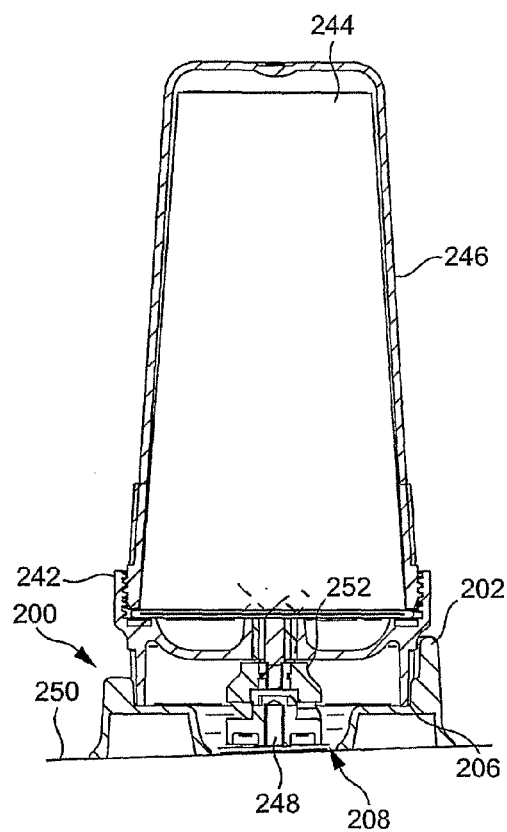
FIG. 18 is a sectional view along line A-A in FIG. 17.

FIG. 17 shows a container assembly 240 mounted in inverted fashion on the seat 200, with its lid 242 received in the concavity 204 on the seat 200. In FIG. 18, it can be seen that a container 244 is clamped between the lid 242 and a holder body 246. The seat 200 is fitted on a blending base unit 250, with a rotatable drive master 248 of the blending base unit 250 extending up through the aperture 208 in the body 202, so as to engage a rotatable drive slave 252 on the lid of the assembly 240.

Figure 19:
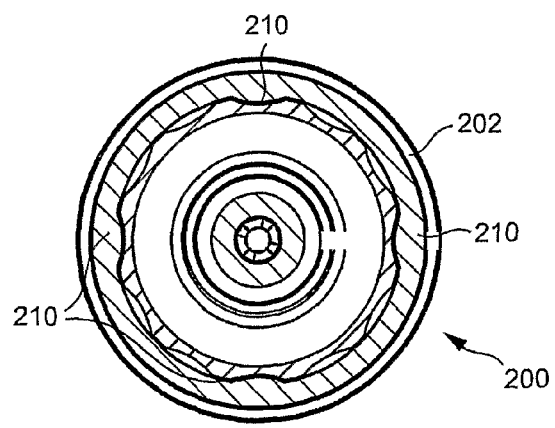
FIG. 19 is a sectional view along line A-A in FIG. 17.

The purpose of the stop projections 210 is to preventing or resist relative rotation between the assembly and the seat 200. This can be of advantage in reducing the risk of twisting forces being transferred to the container during blending, which might otherwise lead to deformation of the container and, hence, leakage. In FIG. 19, it can be seen that the stop projections 210 on the seat 200 nest in the crenelations on the lid 242, for preventing relative movement therebetween.

Of course, other types of stop formation may be provided, preferably to correspond or be complimentary to formations on the lid or holder of an inverted assembly, for resisting rotation of the inverted assembly when mounted on the seat 200.

As can be seen the cup type holder 60 has an aperture 230 in its base, for receiving a mandrill or like projection to assist in the removal of a container from within the assembly, after blending.

Figure 20:
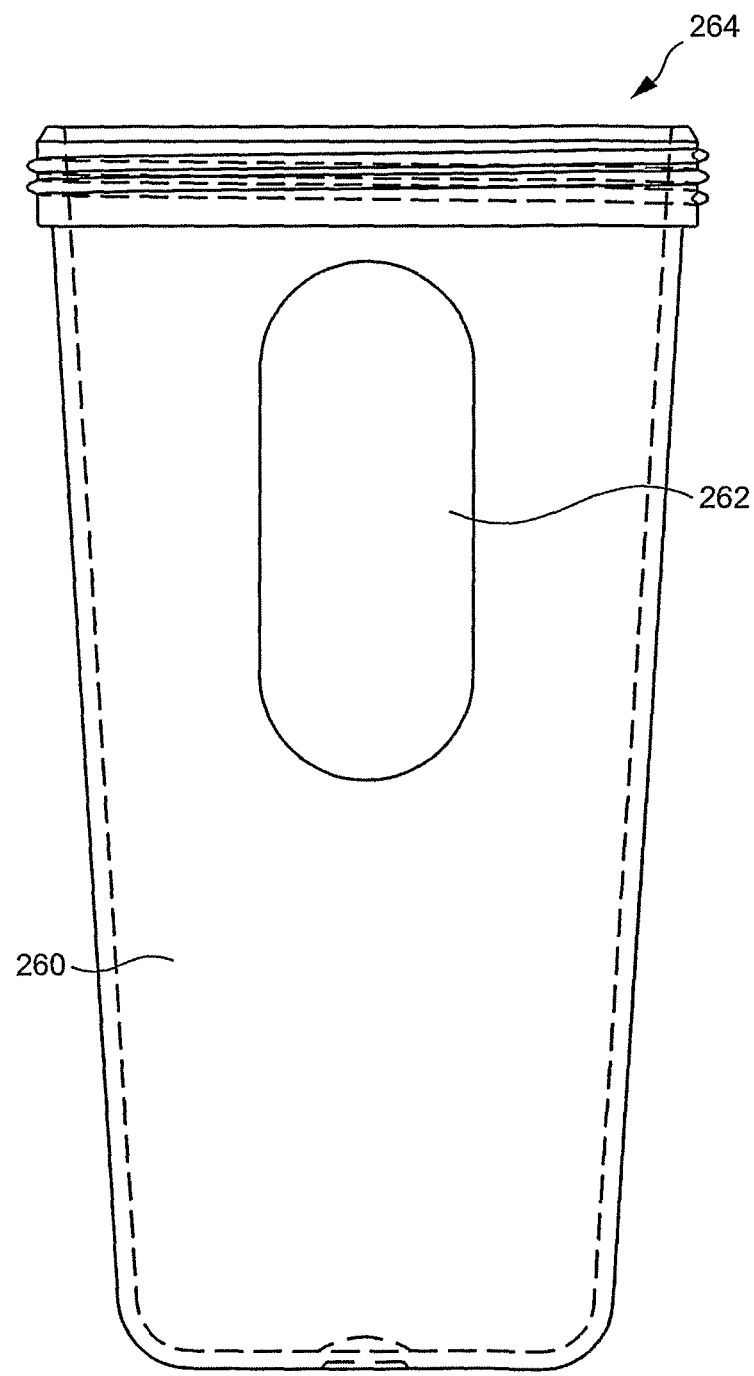
FIG. 20 is a schematic side view of an modified holder for a container assembly.

Additionally, the holder may incorporate at least one aperture in a side thereof, through which the container can be directly engaged by a user for pushing the container upwards and out of the holder. An example of such a holder is indicated at 260 in FIG. 20, wherein a pair of diametrically spaced apertures 262 are provided in the holder 260. A user may utilise his or her thumbs through the apertures 262 to urge a container upwards relative to the holder 260, whilst his or her fingers retain the holder 260 in a secure position, for example. The apertures 262 are spaced from the open end 264 of the holder 260, so as to avoid the risk of direct contact with the rim of the container positioned therein (not illustrated) by a user during removal of the container from the holder 260.

In preferred embodiments, the container is a disposable item formed from paper or cardboard. In the most preferred embodiments of the invention, the container is a disposable, mass produced item, most preferably in the general form of a paper or board type cup familiar to persons in the art, most commonly used for serving coffee, milkshake and ice cream, wherein the container is relatively flimsy in structure and is easily crushable. However, in alternative embodiments, the container is made from plastics material, for example by injection moulding, blow moulding or thermo forming, and may be re-usable.

The most preferred containers for use in the invention are nestable, which is of a particular advantage for transportation, storage or the dispensing of the containers, for example at a point of sale.

It should be noted that the container can be pre-packed with ingredients for use in the blended product, with the advantage that the consumer does not see the ingredients being placed into the container prior to blending. The containers, pre-packaged or not, can be supplied in a nested stack, which is preferably sleeve wrapped.

The container may be of different capacities and dimensions. For example for ice cream product the container may be shorter and or wider in diameter than for milkshake or smoothie type product.

The container may include an insert in the form of an inner powder container, such as described in WO2005/070271, which is incorporated herein by reference.

In the preferred embodiment of FIGS. 1 to 6 and 13 to 15, it will be appreciated that the holder covers only a small proportion of the height of the container when affixed in position with the lid. However, if the container is not strong enough to withstand the pressures associated with operation of the blending element, a holder can be provided having a longer length proportional to the length of the container, so as to provide support over a greater outer surface area of the container. For example, a series of holders can be provided covering one quarter, one third, half, two-thirds, three-quarters or even the entire length of the container, from which a suitable holder can be selected, depending on the type of container to be used, and/or the intended material to be blended within the container, so as to be able to support the container and to resist forces transmitted during blending.

However, the holder may even be of a smaller proportion relative to the container than that shown in FIG. 1 or 13, as required.

A preferred method of blending within the container may involve the assembly being manually inverted and positioned on a blending location or seating for a blending operation. The assembly may be held in place during blending, for example by the application of pressure applied to the upturned end of the container. The pressure may be applied manually or by mechanical means, such as by a powered restraining plate or a plunger type mechanism adapted to engage to the upturned end of the container and to press downwards on the end of the container. If the container is not strong enough to withstand the force applied to hold the container in place during blending, then a holder substantially as illustrated in FIG. 7 to 12 may be preferred, i.e. a holder configured to extend over at least a proportion of the base of the container. In this way, the downward load is transferred to the upturned end of the holder rather than directly on to the base of the container, that would otherwise collapse under the load.

In alternative embodiments in which the holder does not extend over the base of the container, the plunger type clamping element can be configured to engage an annular section of the holder and/or the lid, so as to be in direct contact with the holder and/or the lid, and thereby to avoid direct contact with the base or walls of the container. It will be appreciated, therefore, that the plunger type clamping element may be of a generally annular construction adapted to extend around the container for the avoidance of directly transmitting load thereto.

To allow the same lid to be used for a variety of different capacities of containers, different capacities of container can have the same or similar rim diameter and the same degree of side taper so that the common lid fits correctly in all such different capacities of container.

Furthermore, the angle of the internal walls of the holder can be configured to be shallower than any outside taper of the containers intended to be used as part of the assembly, so that any such container will always fit into the holder.

The lid and blending element may be a single-use, disposable integer of the blending assembly. However, in preferred embodiments, the lid and blending element are re-usable items suitable for cleaning after each blending operation. The re-usable lid and/or blending element is preferably made from rigid plastics material, for example by injection moulding or thermo forming. The blending element may also be made from metal or be in the form of a composite or reinforced plastics element.

The lid may have an opening for admitting a straw, the opening being arranged and configured such that a straw can enter, past the blending element when blending is complete without the blending element obstructing passage into the blended product. The opening may be sealed before use with a tear off or peel off strip, for example.

A convenient way for ensuring that the straw can enter passed the blending element is to use a quadrant shaped hole in the lid for admitting the straw so that, no matter where the blending element stops after blending, there is sufficient space within some point of the quadrant for the straw to pass between the blades of the blending element without obstruction.

It should be noted that the blending element preferably has outwardly directed arms, so as to be configured to create a vortex within the container during blending. This ensures that the ingredients are thoroughly processed within the container, with any air in the container being incorporated into the blended mixture. The operation of the blending element is preferably at a high speed in the range 5,000-18,000 rpm. When the blending element is rotated at high speed it acts like a propellor and forms a vortex of product which causes the components to mix thoroughly and, in particular, draws any powder or solid components down and/or into the liquid component for efficient blending.

It should be noted that the lid can be fitted with a plurality of interchangeable rotatable elements, including a general impeller type blending element, a mixing type element or a whisk type element. Alternatively, the assembly may include a plurality of interchangeable lids, each having a different rotatable element of the kind mentioned above.

The lid may be moulded to include a portion that fits into a matching contour or the like on a blending unit, to prevent the assembly or the lid from revolving by twisting forces during blending. The simplest form of such contour would be a flat section on the outside radius of the lid, but could equally be one or more moulded uprights on the top of the lid.

Preferably, the lid is configured so as to be readily adapted for engagement with a standard type of blending jug, for example, the lid may include screw fitting, bayonet fitting type features for complementary engagement with similar features on a standard blending jug.

It will be appreciated that different sized holders can be provided to suit different sized containers. However, it is preferred that the same lid is used for each application, i.e. that the lid is configured to engage suitably with any holders/container combinations.

The holder and lid of a preferred embodiment of the invention are preferably both nestable, so as to be easily stackable within a magazine along side a blending machine or at the blending location or point of sale, for example.

It should be noted that the lid may be hinged or otherwise movably connected to the holder, so as to form a single unit, wherein the unit is movable between an operative or clamping position for clamping a container therebetween, and an inoperative or open position in which the container can be removed from or introduced into the holder. An additional clamp may also be provided for tightening the holder and lid together, and/or for movement of the lid relative to the holder.

Whereas reference has been made above to the creation of a blended product using power or granulated ingredients and ice containing fluid, other ingredients or combinations of ingredients can be used. For example, the composition can be made up of powders and/or solids and/or semi-solids. Liquids such as milk and fruit juice are also envisaged, as well as alcoholic liquids.

In the case of a re-usable lid for the container, a metal or like blending element can be incorporated into the lid. Such a blending element would be more substantial in construction than would be the case for a single use, disposable lid (typically fitted with a plastics material blending element). In the case of a re-usable lid, therefore, ice cubes or other relatively hard ingredients can be added to the container for blending, wherein the more substantial blending element is able to process and break down the hard ingredient(s). The more substantial blending element will also be readily suited for blending scoops of ice-cream and the like, for example for creating a traditional ice-cream based milkshake drink. Fruit, frozen or fresh, and frozen fruit juice will also be readily applicable to the re-usable blending element fixture, for the production of smoothies.

It should again be appreciated that the containers for use in the most preferred embodiments are preferably intended to be disposed of after a single blending and dispensing operation, for example to be thrown away and broken down for recycling after a single use. Such containers are preferably of the kind familiar to persons who purchase fast-food beverages, such as coffee and milkshake, that is to say a thin walled cup type container made from plastics, paper or cardboard, which is intended to be placed in a waste receptacle after a single dispensing operation.

Figure 21:
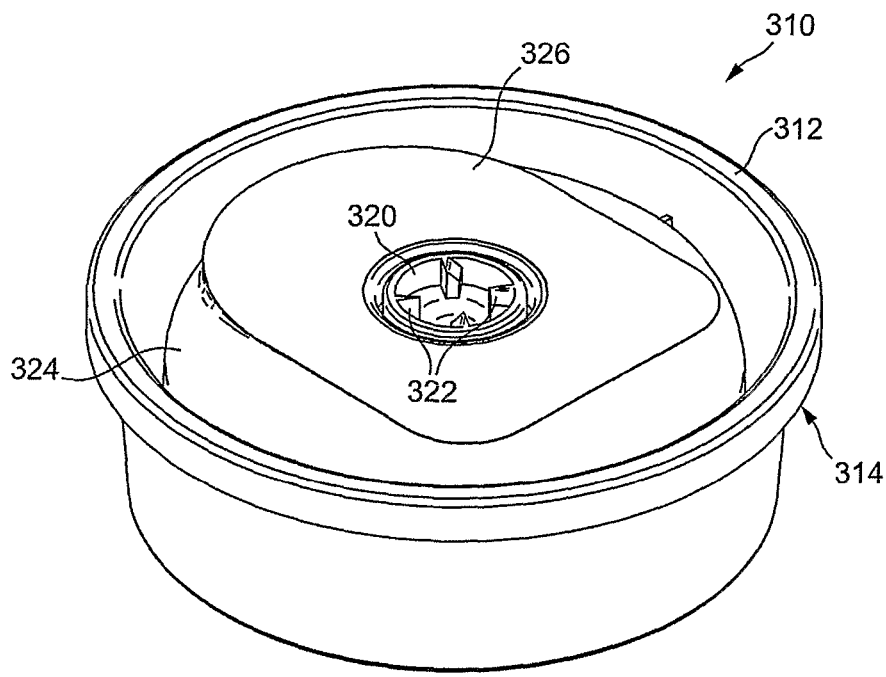
FIG. 21 is a schematic perspective view of the upper side a first blending lid for use on a container.

Referring now to FIG. 21, a further embodiment of a lid for use as a closure for a container, such as a cup for a milkshake, is indicated generally at 310. The lid corresponds substantially with the lid described and illustrated in WO2005/070271 and WO2005/013787.

Figure 24:
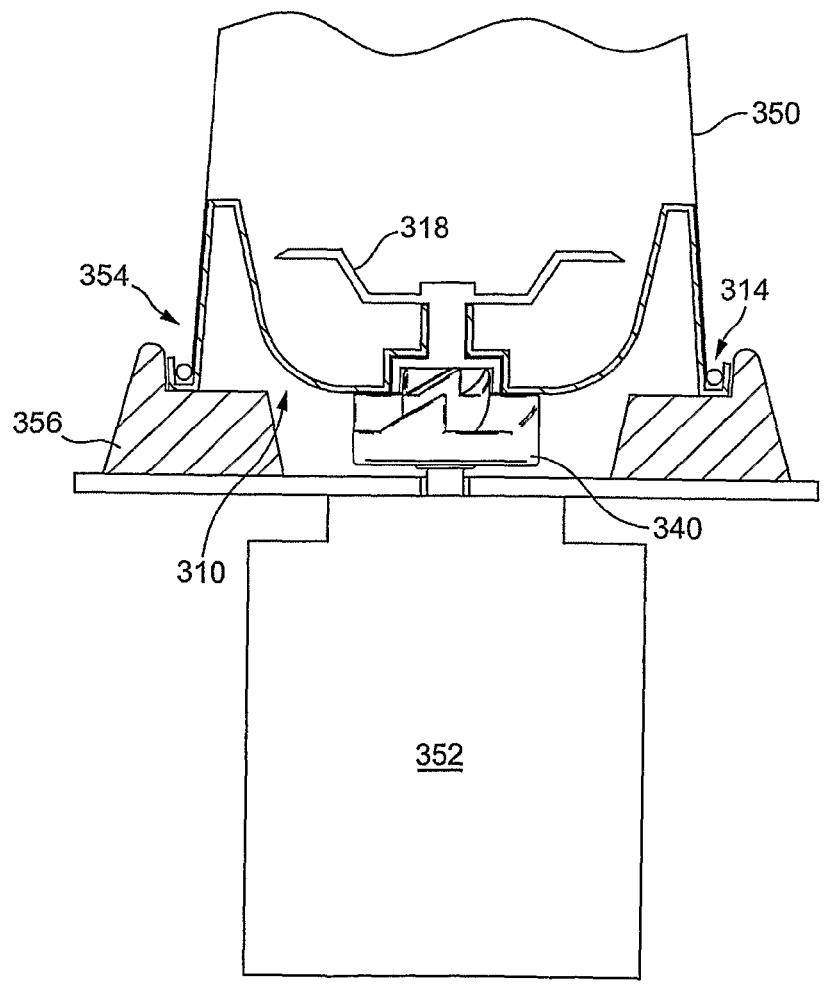
FIG. 24 is a schematic cross-sectional view of a container fitted with the first blending lid of FIG. 21 in driving engagement with drive master of FIG. 23.

The upper end of the lid 310 includes a rim 312, which defines a downwardly disposed and annular channel 314. The channel 314 is configured for receiving the open end or lip of a container to which the lid 310 is intended to be fitted, for example as shown in FIG. 24.

The underside of the lid 310 carries a blending element (see reference numeral 318 in FIG. 24) comprising a plurality of rotor arms, for use in blending food product in a container to which the lid 310 has been fitted. In particular, once fitted to a container, the assembly is inverted, so as to bring food product into operative contact with the blending element 318, for blending. The lid 310 holds the food product in the container during blending.

A drive slave in the form of a drive dog 320 is rotatably mounted on the lid 310. The blending element 318 is coupled to the drive dog 320, so as to be driven to rotate when the drive dog 320 rotates.

The drive dog 320 is configured for operative, driven engagement with a drive master, as will be described in more detail below. In particular, the drive dog 320 defines four drive teeth 322, which are arranged in a radial manner at a first spacing from the central axis of the lid 310. The teeth 322 have a depth d extending in the longitudinal axis of the lid 310, and a length r extending radially with respect to the central axis of the lid 310.

The lid 310 defines a central dome 324, which includes a flat upper surface 326 for supporting the lid 310 in an inverted position at a blending location. The flat upper surface 326 is also important for use in stacking a plurality of lids 310 of the same type and structure. In particular, the rotor arms of the blending element 318 on each lid 310 extend a predetermined distance from the lid 310, and define a planar surface transverse to the longitudinal axis of the lid 310. The planar surface of the rotor arms is arranged to rest in abutment with the flat surface 326 on a subjacent lid 310, for uniformly supporting the first lid 310 on the subjacent lid 310, and for creating a stack of lids 310.

The lid 310 is preferably intended to be supplied as a disposable, single blending use item, which is manufactured from plastics material by injection moulding of the various component parts.

Figure 22:
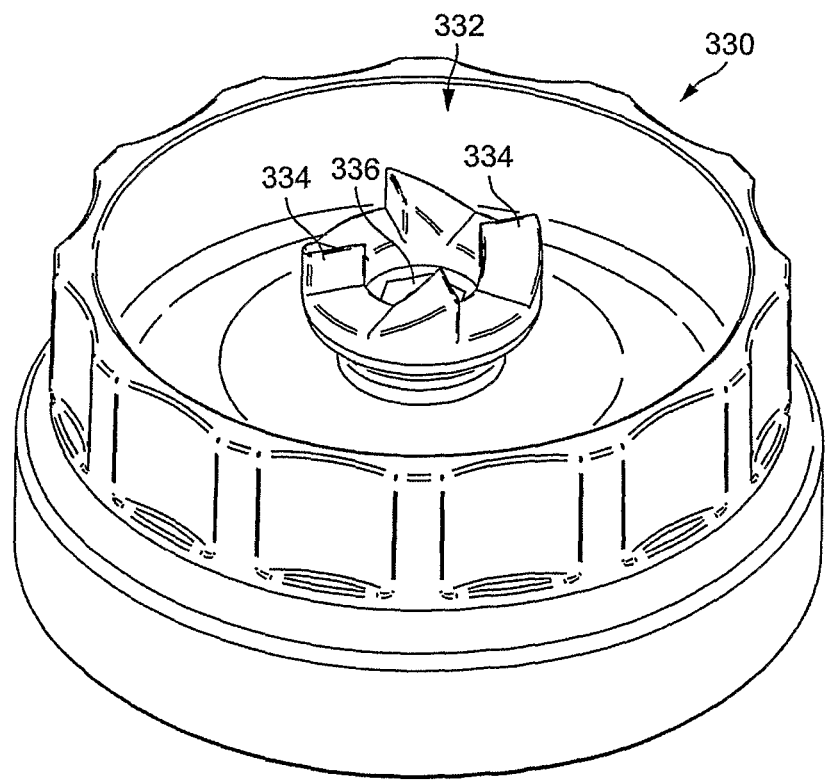
FIG. 22 is a schematic perspective view of the upper side of a second blending lid for use on a container.

Referring now to FIG. 22, a second embodiment of a lid for use as a closure for a container, such as a cup for a milkshake, is indicated generally at 330. The lid 330 corresponds substantially with a lid described above with reference to FIGS. 1 to 20.

As such, the underside of the lid 330 carries a blending element (see FIG. 25) comprising a plurality of rotor arms, for use in blending food product in a container to which the lid 330 has been fitted. As with the lid 310 in FIG. 21, once fitted to a container, the assembly is preferably inverted, so as to bring food product in the container into operative contact with the blending element, for blending thereof.

A drive connection or drive slave in the form of a drive dog 332 is rotatably mounted on the lid 330, in a similar manner to the drive dog 320 on the lid 310 in FIG. 21. As such, the blending element on the lid 330 is coupled to the drive dog 332, so as to be driven to rotate when the drive dog 332 rotates.

As with the drive dog 320 in FIG. 21, the drive dog 332 is configured for operative driven engagement with a drive master, as will be described in more detail below. In particular, the drive dog 332 defines four radially spaced drive teeth 334. The teeth 334 have a longitudinal depth D, which is greater than the depth d of the teeth 322 on the lid 310 in FIG. 21. The teeth 334 are also arranged at a radial spacing from the centre of the drive dog 332, the spacing being greater than the radial extent of the teeth 322 on the lid 310 in FIG. 21. Furthermore, the teeth 334 on the lid 330 have a radial length R, which is greater than the radial length r of the teeth 322 on the lid 310 in FIG. 21. Moreover, the drive dog 332 defines a central recess 336 which is greater in diameter than the drive dog 320 on the lid 310 in FIG. 21.

The lid 330 is preferably more substantial in structure than the lid 310 in FIG. 1, and is preferably supplied as a re-usable blending lid. As such, the drive dog 332 is preferably made from a higher grade plastics material than the drive dog 320 used on the lid 310 from FIG. 21, so as to be able to withstand the higher cumulative pressures and temperatures associated with multi-use in both blending and sanitising operations, so as to reduce wear, for example. As such, the drive dog 332 may be made from or include a portion which is made from a different material to the remainder of the lid 330. For example, it may only be necessary for a bearing element, by means of which the drive slave is able to rotate, to be made from the higher grade material, wherein the remainder of the drive slave is made of the different material (e.g. the same as the remainder of the lid).

Figure 23:
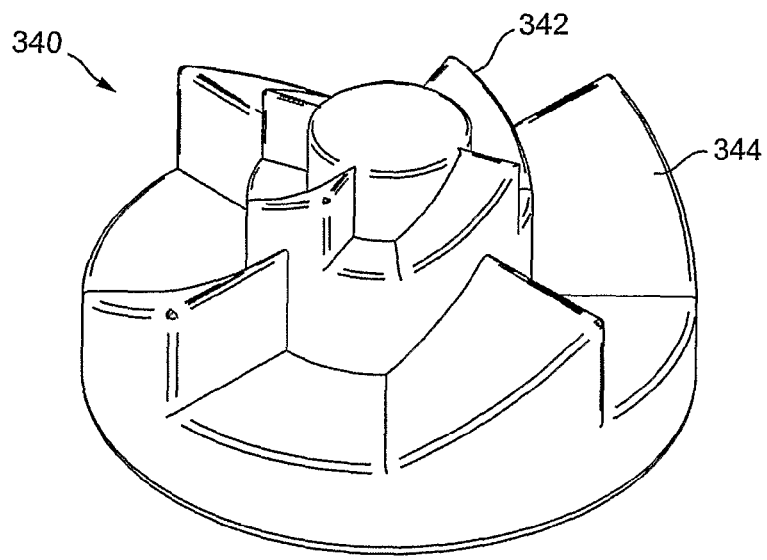
FIG. 23 is a perspective view of the upper side of a drive master for use with the first and second blending lids of FIGS. 21 and 22.

Referring now to FIG. 23, a drive master for use in driving the drive dogs 320 and 332 of FIGS. 21 and 22, respectively, is indicated at 340.

The drive master 340 includes two sets of drive teeth 342, 344, offset from one another in both the longitudinal and radial directions. The first set of drive teeth 342 are configured for operative driving engagement with the drive teeth 322 on the lid 310, whereas the second set of drive teeth 344 are arranged outwardly from, and beneath the level of the first set of drive teeth 342, so as to be configured for operative driving engagement with the drive teeth 334 on the lid 330. The longitudinal depth, radial length and radial spacing of the first and second sets of teeth 342, 344 are configured to correspond generally to the depth, length and spacing of the respective teeth 322, 334 on the lids 310 and 330. Hence, the drive master 340 is conveniently configured for use with both lids 310 and 330.

Figure 25:
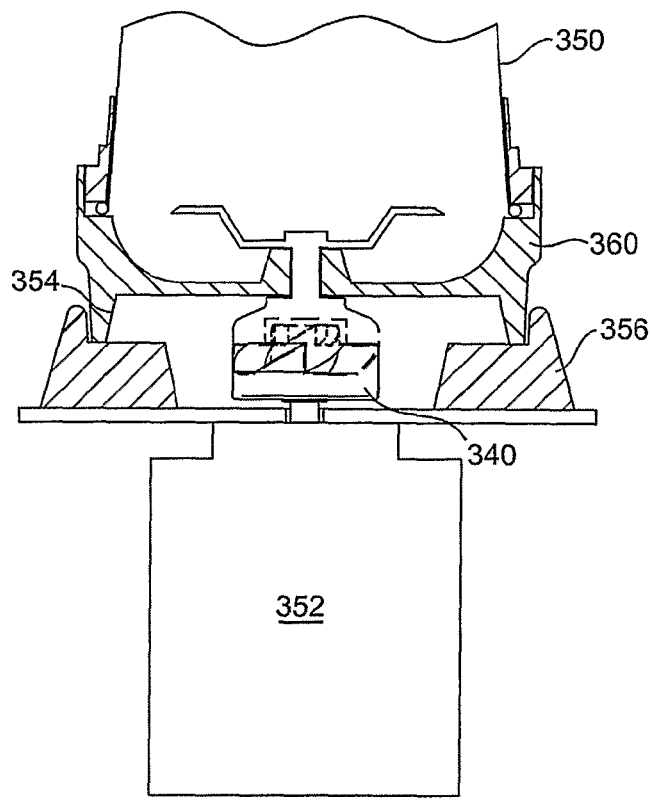
FIG. 25 is view similar to FIG. 24, showing a container fitted with the second blending lid of FIG. 22 in driving engagement with drive master of FIG. 23.
Figure 26:
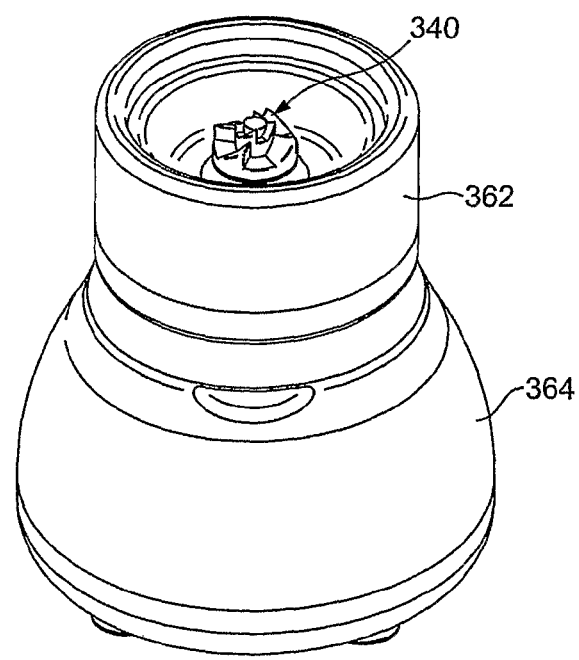
FIG. 26 is a schematic perspective view of an adapter in use for coupling the drive master of FIG. 23 to a conventional blender.
Figure 27:
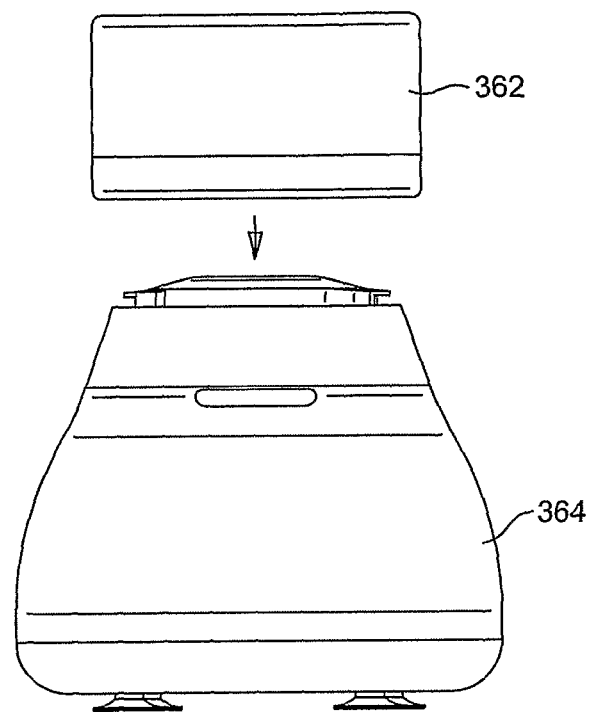
FIG. 27 shows the adapter of FIG. 26 in a disengaged state.

FIGS. 24 and 25 show the respective lids 310 and 330 in position on a container 350 and inverted in a preferred blending position. In particular, the lids 310 and 330 are shown with their respective drive dogs 320, 332 in active engagement with the respective portions 342, 344 of the drive master 340. Drive master 340 is coupled to a motor 352 for selective driven rotation of the drive master 340, so as to rotate the respective drive dogs 320, 332 and thereby cause blending of product within the respective containers 350. In both cases, an outer portion 354 of the upper side of the lid 310, 330, when in the blending position shown in FIGS. 24 and 25, engages with a seating 356 which is arranged substantially annular to the drive master 340. In this way, the lids 310, 330 and their respective containers 350 are uniformly supported in their inverted position at the blending location.

It should be noted from FIG. 25, that the recess 336 on the drive dog 332 envelops the upper end of the drive master 340, when mounted in the inverted blending position. It should also be noted that the lid 330 is coupled to the container 350 using a holder 360 substantially as described with reference to FIG. 1.

Referring now to FIGS. 26 to 29, it can be seen that the drive master 340 can be mounted in an adapter 362, which is configured to be fitted to the base 364 of a conventional blending machine.

In particular, the drive master 340 is rotatably mounted on the adaptor 362, so as to be operatively connectable to the drive motor of convention blending machine, for selectively driving the drive master 340.

Figures 28, 29:
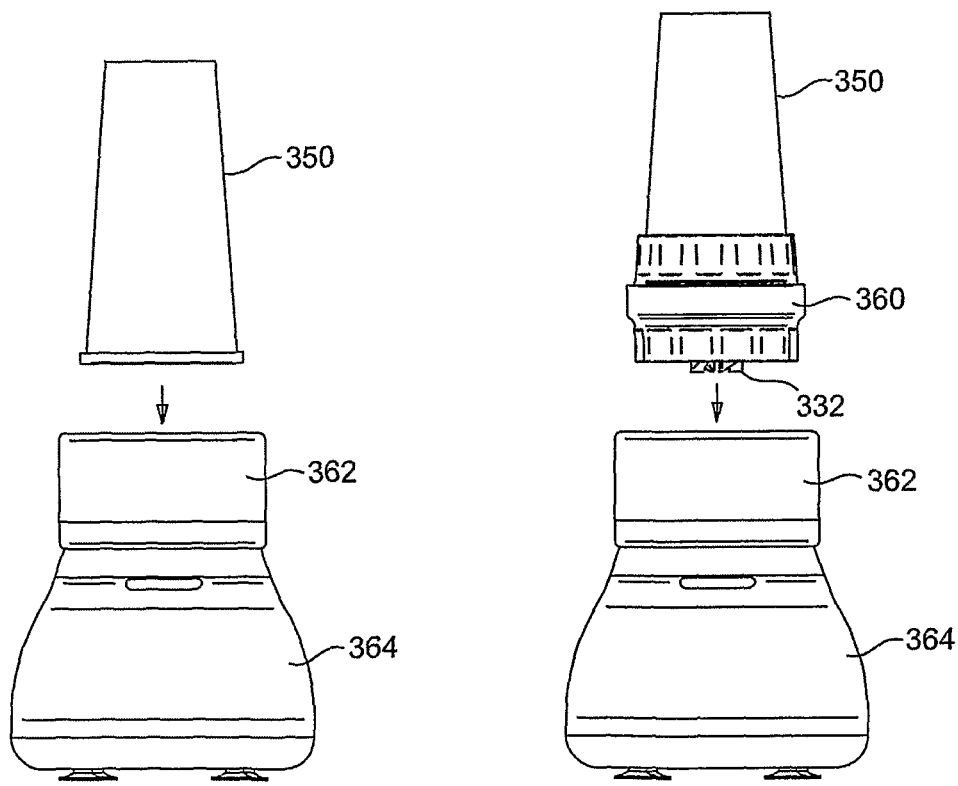
FIG. 28 shows a container fitted with the first blending lid of FIG. 21, arranged for use with the adapter of FIGS. 26 and 27.
FIG. 29 shows a container fitted with the second blending lid of FIG. 22, arranged for use with the adapter of FIGS. 26 and 27.

As can be seen from FIGS. 28 and 29, the lids 310, 330 can be fitted to the respective containers 350 and then inverted and placed into driving engagement with the drive master 340 substantially as described above with reference to FIGS. 24 and 25, for blending products with the containers 350.

It should be noted that in accordance with the above embodiments, the container 350 is devoid of any positive interdigitation features, either adjacent its base or its open end, such as a screw thread or bayonet type fitting or any other form of fixing device specifically adapted to directly interlock with the open end of the container for securing the lids 310, 330 directly to the container, or to directly interlock the base on a blending location. It is essential that this is appreciated when considering the type of container encompassed by these preferred embodiments of the invention, in the same manner as with reference to FIGS. 1 to 20.

It will be readily appreciated that the drive master described above may include more than two drive arrays, for example three or four drive arrays, which are configured for interchangeable use with a corresponding number of complimentarily arranged drive slaves, for example on three or four blending lids having different drive slaves. Such drive arrays be of any suitable form, such as a plurality of co-axially arranged toothed arrays, similar to those illustrated in the accompanying Figures.

The invention claimed is:

1. A method for preparing a blended food product, the method comprising:
   receiving food product to be blended in a container, the food product comprising an ice containing fluid, and providing the container with an open end through which the product to be blended is introduced into the container, the open end of the container including an out-turned lip defining an integrated circumferential lip, wherein the providing step comprises providing a beaker-type container which is disposable and made from thin walled, crushable paper or board material;
   receiving the container in a holder by introducing the container through an open end of the holder;
   providing an upper end of the holder with an inner diameter that is smaller than an outer diameter of the circumferential lip to define an annular surface onto which the circumferential lip can rest supportedly when the container is received by said holder via introduction of the container through the open end of the holder, the circumferential lip preventing the container from passing through the holder;
   carrying an impeller on a closure for the purpose of blending food product within the container, wherein the closure is separate from the holder and the container; and
   coupling the closure with the holder for the purpose of a blending operation and then decoupling the closure from the holder in order to remove the container from the holder after blending,
   wherein, when the closure is coupled with the holder, the method comprising extending the closure over the open end of the container and the circumferential lip at the open end of the container and positively engaging with the holder, to thereby form a blending assembly with said holder and said container, and sealingly enclosing the food product to be blended within said assembly for said blending operation.

2. A method according to claim 1, further comprising extending at least an upper portion of the holder into a cavity defined by an underside of the closure when the closure is coupled with said holder for the purpose of a blending operation.

3. A method according to claim 2, comprising configuring an internal wall of the concavity to extend over an outer wall of the holder and configuring the internal wall for positive engagement with said outer wall of the holder, in order to secure at least an upper part of the holder within the concavity.

4. A method according to claim 3, comprising providing a threaded connection between said internal wall of the concavity and said outer wall of the holder.

5. A method according to claim 1, wherein the holder is in the form of collar on which the container is supportable, with the lip of the container located against an upper part of the collar, and a lower end of the container extending through said collar.

6. A method according to claim 1, comprising configuring the holder to positively engage the closure for the purpose of a blending operation by a rotation-type or twist-type connection.

7. A method according to claim 6, comprising providing a threaded connection between said closure and said holder.

8. A method according to claim 7, comprising providing the closure with a threaded profile for engagement with a complimentary thread on the holder.

9. A method according to claim 6, comprising providing a bayonet connection between said closure and said holder.

10. A method for preparing a blended food product, the method comprising:
   receiving food product to be blended in a container, the food product comprising an ice containing fluid, and providing the container with an open end through which the product to be blended is introduced into the container, the open end of the container including a circumferential lip, wherein the providing step comprises providing a beaker-type container which is disposable and made from thin walled, crushable paper or board material;
   receiving the container in a holder by introducing the container through an open end of the holder, an upper end of the holder including an annular surface onto which a portion of the container can rest supportedly when the container is received by said holder via introduction of the container through the open end of the holder;
   carrying an impeller on a closure for the purpose of blending food product within the container, wherein the closure is separate from the holder and the container;
   coupling the closure with the holder for the purpose of a blending operation and then decoupling the closure from the holder in order to remove the container from the holder after blending,
   wherein, when the closure is coupled with the holder, the method comprising extending the closure over the open end of the container and the lip at the open end of the container and positively engaging with the holder, to thereby form a blending assembly with said holder and said container, and sealingly enclosing the food product to be blended within said assembly for said blending operation; and configuring the holder and the closure to be inter-engaged, whereby to clamp the lip at the open end of the container between the closure and the holder for the purpose of a blending operation.

11. A method for performing a blending operation comprising:

receiving food product to be blended in a container, the food product comprising an ice containing fluid, and providing the container with an open end through which product to be blended is introduced into the container, wherein the providing step comprises providing a beaker-type container which is disposable and made from thin walled, crushable paper or board material, and providing the container with an out-turned lip defining an integrated circumferential lip;

introducing the container through an open end of a holder, the holder defining a collar;

supporting the container in the holder, providing the holder with an inner diameter that is smaller than an outer diameter of the circumferential lip, and providing the collar with a depth that is less than a depth of the container, so that the circumferential lip is supported on an annular surface of the holder and the circumferential lip prevents the container from passing through the holder, and so that a lower end of the container projects beyond the collar when the container is supported on the collar after introduction of the lower end of the container through said open end of the collar;

carrying an impeller on a closure for the purpose of blending food product within the container, wherein the closure is separate from the collar and the container and is configured to be coupled to the collar for the purpose of a blending operation and then decoupled from the collar in order to remove the container from the holder after blending; and extending at least an upper portion of the collar into a concavity defined by an underside of the closure when the closure is coupled with said collar for the purpose of said blending operation, and providing an internal wall of the concavity with a formation for positive engagement with a complimentary formation on an outer wall of the collar, for the purpose of securing the closure relative to the collar for said blending operation.

12. A method according to claim 11, comprising configuring the closure and the collar to be inter-engaged, whereby to clamp the circumferential lip at the open end of the container between the closure and the collar.

13. A method according to claim 11, comprising configuring the collar to positively engage the closure for the purpose of a blending operation by a rotation-type or twist-type connection.

14. A method according to claim 13, comprising providing a threaded connection between said closure and said holder.

15. A method according to claim 14, comprising providing the closure with a threaded profile for engagement with a complimentary thread on the holder.

16. A method according to claim 13, comprising providing a bayonet connection between said closure and said holder.

17. A method according to claim 11, further comprising, after securing the closure relative to the collar for said blending operation and before said blending operation, inverting said container such that said closure is lowermost.

* * * * *